(12) United States Patent
Bar et al.

(10) Patent No.: US 12,222,902 B1
(45) Date of Patent: Feb. 11, 2025

(54) REVISIONS TO SMART FILES

(71) Applicant: HoneyBook, Inc., San Francisco, CA (US)

(72) Inventors: Gal Bar, Tel Aviv (IL); Daniel Benor, Sydney (AU); Dvir Cohen, Tel Aviv (IL); Nurit Bahat, Tel Aviv (IL); Carmel Arad, Tel Aviv (IL)

(73) Assignee: HoneyBook, Inc., San Francisco, CA (US)

( * ) Notice: Subject to any disclaimer, the term of this patent is extended or adjusted under 35 U.S.C. 154(b) by 0 days.

(21) Appl. No.: 18/480,287

(22) Filed: Oct. 3, 2023

(51) Int. Cl.
  *G06F 16/17* (2019.01)
  *G06F 16/13* (2019.01)

(52) U.S. Cl.
  CPC ........ *G06F 16/1734* (2019.01); *G06F 16/137* (2019.01)

(58) Field of Classification Search
  None
  See application file for complete search history.

(56) References Cited

U.S. PATENT DOCUMENTS

| | | | | |
|---|---|---|---|---|
| 9,811,532 | B2 * | 11/2017 | Parkison | G06F 3/0635 |
| 10,545,792 | B2 | 1/2020 | Li | |
| 12,063,304 | B1 * | 8/2024 | Dittmer | H04L 9/3093 |
| 12,079,175 | B2 * | 9/2024 | Devaraj | G06F 16/1734 |
| 2012/0117080 | A1 | 5/2012 | Lamanna et al. | |
| 2014/0006354 | A1 * | 1/2014 | Parkison | G06F 3/0635 |
| | | | | 707/661 |
| 2015/0324178 | A1 | 11/2015 | Arnold et al. | |
| 2022/0058094 | A1 * | 2/2022 | Gunturu | G06F 11/1464 |
| 2022/0121628 | A1 * | 4/2022 | Devaraj | G06F 11/323 |
| 2023/0179975 | A1 * | 6/2023 | Pateromichelakis | H04W 4/50 |
| | | | | 709/217 |
| 2024/0039732 | A1 * | 2/2024 | Luo | H04L 9/3239 |
| 2024/0289448 | A1 * | 8/2024 | Cohen | G06F 21/6245 |
| 2024/0289490 | A1 * | 8/2024 | Cohen | G06F 21/6245 |
| 2024/0291863 | A1 * | 8/2024 | Cohen | G06F 21/554 |
| 2024/0311476 | A1 * | 9/2024 | Cohen | G06F 21/554 |
| 2024/0314168 | A1 * | 9/2024 | Cohen | H04L 63/1491 |

OTHER PUBLICATIONS

The Hash Function.*

* cited by examiner

*Primary Examiner* — Kim T Nguyen
(74) *Attorney, Agent, or Firm* — Athorus, PLLC

(57) ABSTRACT

Disclosed implementations include systems and methods to efficiently determine a block or blocks of a smart file that have changed, without accessing the block or blocks. For example, the disclosed implementations generate and maintain a nested hash value tree that includes block hash values for at least some blocks of a smart file, and element hash values for at least some elements of the blocks of the smart file for which a block hash value is maintained. The nested hash value tree may be traversed to determine elements and/or blocks of the smart file that have changed without having to access or process the smart file. Still further, the elements and/or blocks of the smart file that have changed may be processed without processing other elements and/or blocks of the smart file to determine the actual change(s) to the smart file.

20 Claims, 15 Drawing Sheets

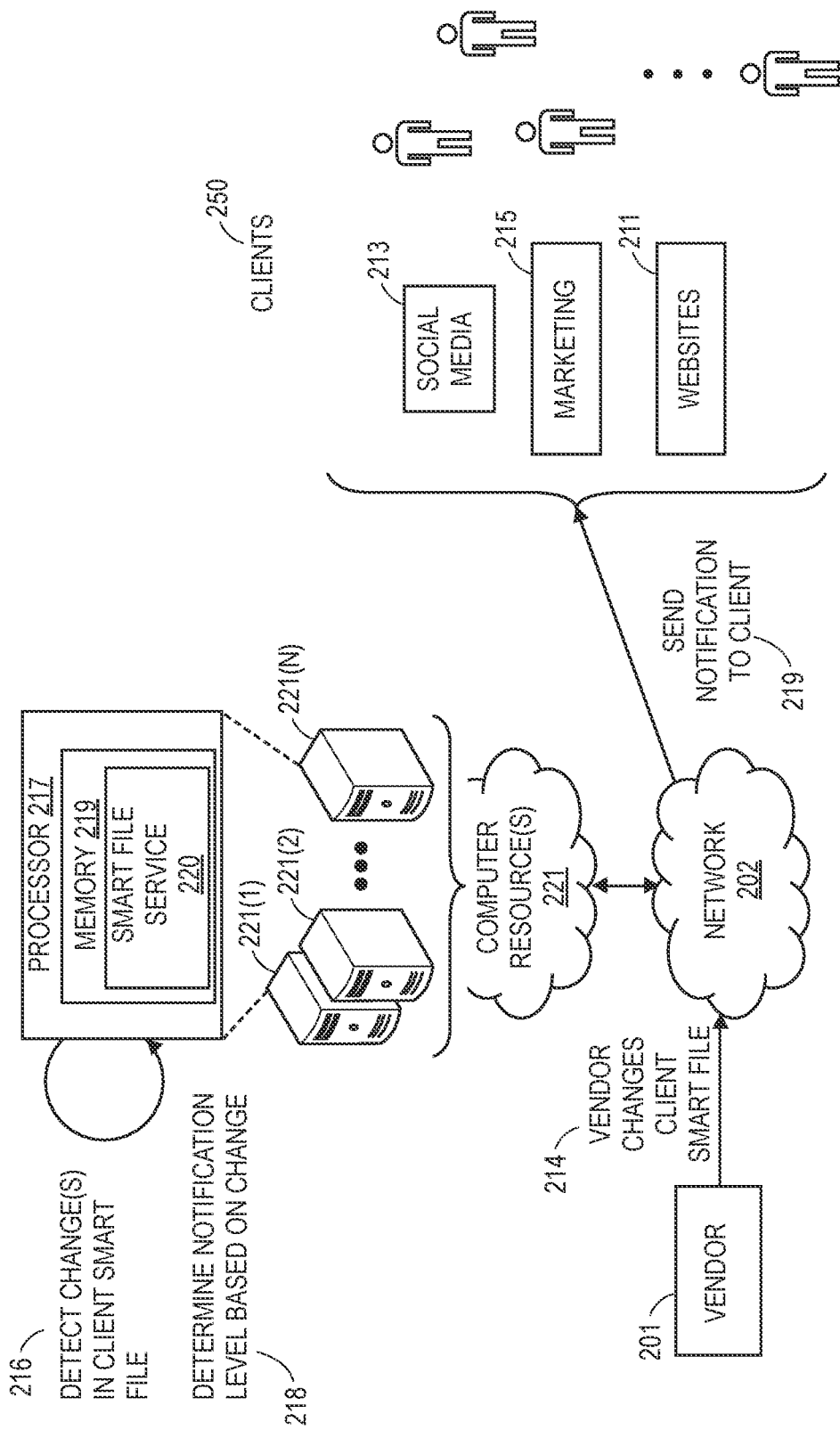

SCHEDULER BLOCK 402E

AT COACHING

CLIENT: STEVE SMITH

DATE: 2023-08-04

PLEASE SELECT AN AVAILABLE DATE AND TIME

DURATION : SIX MONTHS

FREQUENCY : MONTHLY

SESSION LENGTH: 90 min

AUGUST 2023

| MON | TUE | WED | THU | FRI | SAT | SUN |
|-----|-----|-----|-----|-----|-----|-----|
|     | 1   | 2   | 3   | 4   | 5   | 6   |
| 7   | (8) | 9   | 10  | 11  | 12  | 13  |
| 14  | 10  | 16  | 17  | 18  | 19  | 20  |
| 21  | 22  | 23  | 24  | 25  | 26  | 27  |
| 28  | 29  | 30  | 31  |     |     |     |

SPECIFIC TIME

AM  (9:30)  (11:00)

PM  (12:10) (2:00)  (4:00)

(NEXT)

FIG. 4A

CONTRACT BLOCK 402D

CONTRACT

This agreement made on [2023-08-04], between [STEVE SMITH, (CLIENT)] and AT consulting, for consulting service, having a first session date on [2023-08-08] and continuing for a duration of [SIX MONTHS].

CONTRACTED SERVICE
Includes [SIX MONTHS] of consulting services with [monthly] sessions of 90 minutes in duration.

FEE
The fee to be paid by client to vendor is [$3,000 per month], with payment for each month due [at least four days prior to the session].

INVOICE BLOCK 402C

INVOICE

DIRECT CONSULTING SERVICES [6-MONTH DURATION], will work together over six months, to help you hit your goals through monthly consulting sessions.
— 434A
— 434B Subtotal : $18,000
Tax : 0
TOTAL(USD) : $18,000
— 434C

PAYMENT SCHEDULE

| AMOUNT | DUE DATE |
|---|---|
| $3,000 | 8/04/2023 |
| $3,000 | 9/04/2023 |
| $3,000 | 10/04/2023 |
| $3,000 | 11/04/2023 |
| $3,000 | 12/04/2023 |
| $3,000 | 01/04/2024 |

REVISIONS TO SMART FILES

BACKGROUND

Businesses, also referred to herein as vendors, are now frequently interacting with customers electronically to create and manage a variety of aspects of the client experience, such as onboarding, service selection, contracting, invoicing, payments, etc. However, current systems require multiple different documents or communications and keeping track of different modifications to different documents with different clients is difficult if not impossible.

BRIEF DESCRIPTION OF DRAWINGS

The detailed description is described with reference to the accompanying figures.

FIGS. 2A, 2B, 2C, and 2D illustrate an example transition diagram for generating a smart file, publishing the smart file, determining changes to the smart file, and notifying a client of changes to the smart file, in accordance with disclosed implementations.

FIG. 4A is an example illustration of a scheduler block that may be included in a smart template and/or a smart file, in accordance with disclosed implementations.

FIG. 4B is an example illustration of a contract block that may be included in a smart template and/or a smart file, in accordance with disclosed implementations.

FIG. 4C is an example illustration of an invoice block that may be included in a smart template and/or a smart file, in accordance with disclosed implementations.

DETAILED DESCRIPTION

Figure 1A:
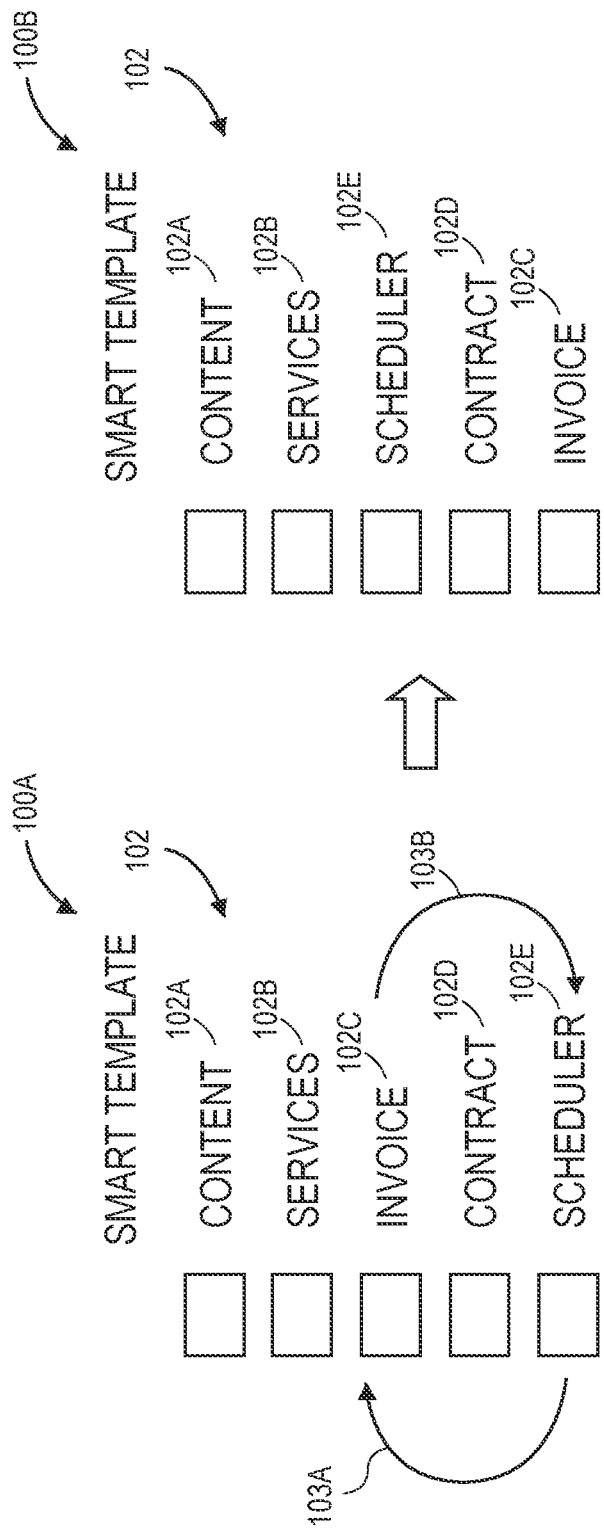
FIG. 1A is a block diagram of a smart template that includes a plurality of blocks that may be rearranged by a vendor, in accordance with disclosed implementations.

Described are systems and methods to efficiently determine a block(s) and/or elements of a smart file that have changed. A "smart file," as used herein is a client-facing file that may include any combination of blocks and/or elements, in any order, as specified by a vendor creating the smart file. A smart file could be anything from a simple one-page invoice, a contract, or a questionnaire, to a multi-step booking arrangement that allows a client to select a service of a vendor, sign a contract with that vendor, make payments to that vendor, etc., all as part of single interaction with that one smart file. In some examples, changes made to one block of a smart file may automatically affect other blocks of the smart file.

As discussed further below, the disclosed implementations generate and maintain a nested hash value tree that can be traversed to quickly determine a block(s) and/or element(s) of a block of a smart file that have changed between a prior or stored instance of the smart file and a current instance of the smart file, without having to process or compare the prior/stored instance of the smart file and the current instance of the smart file. Still further, in some implementations, once the block(s) and/or elements of the smart file that have changed are determined, the block(s) and/or elements of the prior/stored instance of the smart file and the current instance of the smart file may be processed to determine the actual change(s) that occurred between the block(s)/element(s) and a determination made as to whether a notification and/or a request for confirmation of the actual change is to be sent to at least one of a client or a vender that is associated with the smart file. In instances when a request for confirmation is sent, the receiving party may be required to confirm the change, before the change is considered added to the smart file.

In some implementations, a determination may be made as to whether the block or one of the blocks that are determined to have changed are indicated as a block(s) for which a notification and/or request for confirmation is required, regardless of the actual change to the block. In such an instance, the determined actual change for the block or blocks may be sent for presentation to one/both of the vendor or client that is associated with the smart file. In other implementations, the notification and/or request for confirmation may be sent to a third party, in addition to, or as an alternative to sending the notification and/or request for confirmation to the vendor and/or client.

If it is determined that the block or blocks that are determined to have actually changed between the prior instance of the smart file and the current instance of the smart file are not indicated as blocks for which a notification or request for confirmation is required, the actual change may be further processed to determine if the actual change warrants a request for confirmation of the change, a notification without a request for confirmation, or no notification. For example, if the actual change is a correction to a misspelled word or a correction to a grammatical error, it may be determined that no notification is needed. However, in some examples, some blocks, such as an invoice block, may require a notification of any change, regardless of whether it is a misspelled word, a correction to a grammatical error, or anything else. As another example, if the actual change is an update or replacement of a graphic or logo of the vendor, it may be determined that a notification of the change is to be sent for presentation to the client, but a request for confirmation is not needed. As still another example, if the actual change is a change in an hourly fee, duration of service, change in a meeting date or time, etc., it may be determined that a confirmation of the actual change be received from the client. As will be appreciated, there are numerous examples in which the actual change may require no notification, notification without confirmation, or a request for confirmation and those provided herein are for explanation purposes only and are not limiting.

While the examples discussed herein primarily focus on a smart file and interactions between a single vendor and a single client, it will be appreciated that the disclosed implementations may also be used with a smart file between a single vendor and multiple clients, a smart file between multiple vendors and a single client, or a smart file between multiple vendors and multiple clients.

FIG. 1A is a block diagram of a smart template 100A/100B that includes a plurality of blocks 102 that may be added, arranged, rearranged, and customized by a vendor, in accordance with disclosed implementations.

A smart template 100A/100B may be created and used to generate smart files. A smart template 100A/100B may include any number and/or types of blocks 102 that may be arranged in any order specified by the vendor. Likewise, each block may include any number of elements. Blocks 102, as used herein, include, but are not limited to, a content block 102A, a services block 102B, a scheduler block 102E, an invoice block 102C, and a contract block 102D. A content block 102A may be further specified as a text content block, a questions content block, an image content block, or a video content block. Examples of other blocks that may be utilized with the disclosed implementations include timeline blocks, social proof blocks, Hypertext Markup Language ("HTML") blocks, tasks blocks, collect feedback blocks, upload files blocks, download files blocks, client initialing blocks, client signature blocks, code blocks, blocks that allow links to other applications/services, conditional logic blocks, etc.

Figure 1B:
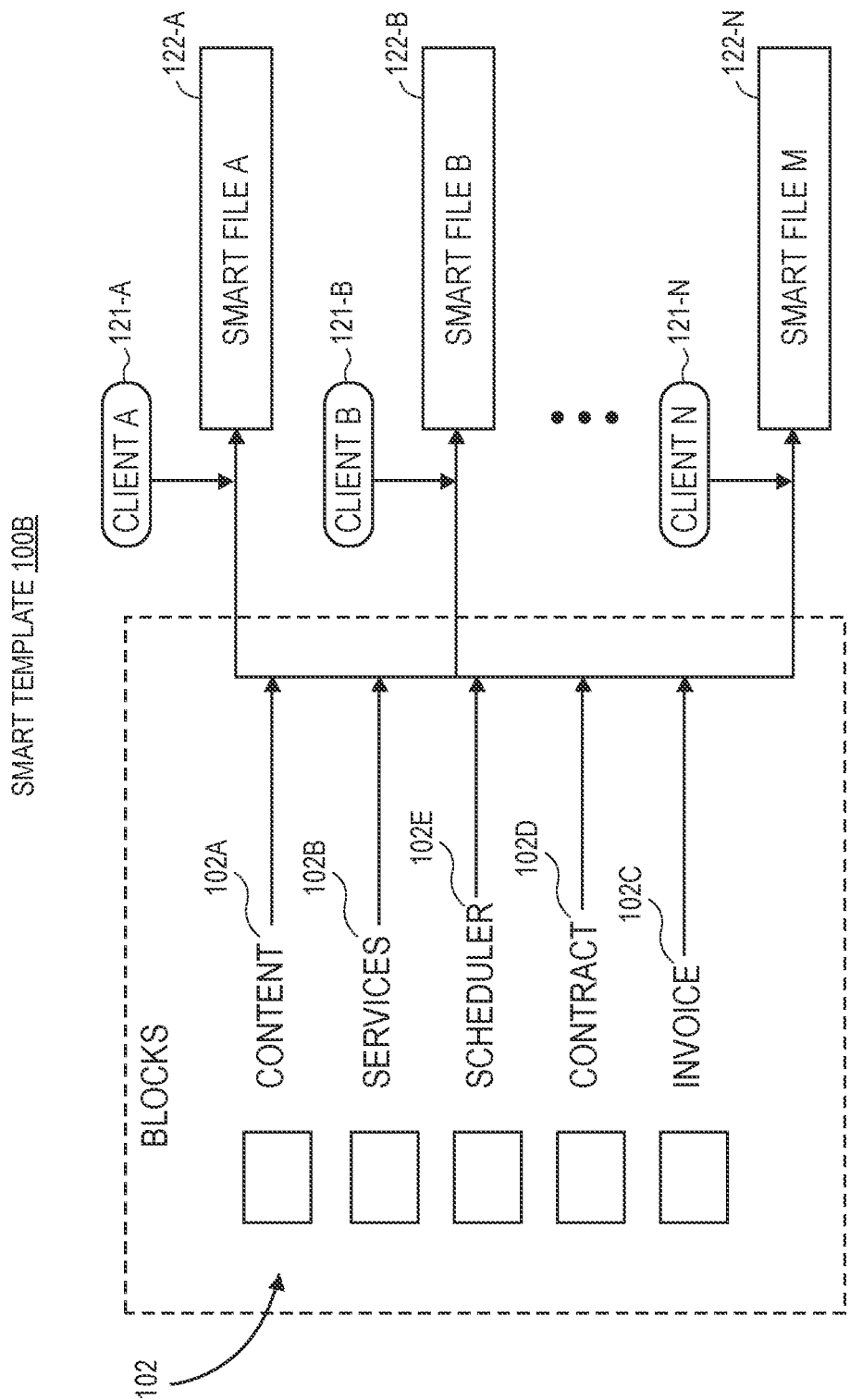
FIG. 1B is a block diagram of a smart template and the creation of multiple smart files from the smart template, in accordance with disclosed implementations.

When utilized, a smart template may be used to generate a smart file that includes any number of blocks, each block with any number of elements. The generated smart file may be sent to a client, presented on a webpage, provided as a publicly facing link, stored in memory and accessible by clients, etc. In some implementations, a smart template may be used by a vendor to create multiple smart files. For example, and as illustrated in FIG. 1B, a vendor may use a smart template 100B to create smart files 122-A, 122-B, through 122-N for each client that interacts with the vendor, adding client specific information 121-A, 121-B, through 121-N as part of the generation of the smart file from the smart template 100B. As another example, a smart template 100A/100B may be used to generate different smart files that are sent for presentation to different groups of clients that may be segmented in any of a variety of ways (e.g., location, age, gender, income, etc.). As still another example, if a client interacts with a publicly facing link, webpage, etc., corresponding to a smart file/smart template, a smart file that is specific between the client and the vendor may be automatically created. For example, if a first client interacts with a public-facing link that relates to a smart template created by a first vendor, upon interaction with that link by the first client, a smart file is automatically generated from the smart template and that smart file is specific to the first client and the first vendor.

To facilitate ease of discussion, rather than using both "client" and "potential client," as used herein, unless specifically stated otherwise, "client" includes both a client, which is a person or entity that has an existing relationship with a vendor and/or a potential client, which is a person or entity that does not have an existing relationship with a vendor.

Referring back to FIG. 1A, a text content block may be a block 102 that can be positioned anywhere in a smart template 100A/100B and/or smart file, as discussed herein, that includes text. As will be appreciated there are any number of text content block layouts from a text only block, a title and text block, a two-column text block, an icon and text block, an image and text block, a video and text block, a splash block, a text approval block, an image approval block, etc. Likewise, a text content block may include any number of elements. For example, a text only content block may only include one element corresponding to the text of the content block. Alternatively, a different element may be generated for each sentence or each word of a text only content block. As another example, for an image and text block, a first element may exist for the text and a second element for the image. Alternatively, like the text only content block, a different element may be defined for each sentence or each word of the text portion of the content block and another element for the image of the content block.

A questions content block may likewise be positioned anywhere in a smart template and/or a smart file. Likewise, there may be any number of question content block layouts, such as, but not limited to, a single question block, a questionnaire block, a form block, a text approval block, an image approval block, an image selection block, a question and text block, a question and image block, etc. In some examples, each question of a content block may correspond to an element of the content block. In other examples, each sentence or each word of a sentence may represent an element of a question content block. Likewise, in some implementations, responses provided by a client to a question may be utilized as an element of the question content block. For example, when a client provides a response to a question, the response may be treated as an element of the question content block. Alternatively, or in addition thereto, the client provided response may also be automatically provided to other content blocks, as discussed further herein. For example, if the question block includes the question "What is your project date?" and the client provides a response of "Aug. 4, 2024," that response may be automatically provided to, for example, other content blocks, invoice blocks, contract blocks, etc., that may include elements corresponding to the project date.

An image content block may likewise be positioned anywhere in a smart template and/or a smart file. Likewise, there may be any number of image content block layouts, such as, but not limited to, a single image block, a multiple image block, an image grid block, an image and text block, and multiple images and text block, an image grid and text block, a left image and text block, and image and question block, an icon and text block, a splash block, an image approval block, an image selection block, etc. As with the other content blocks, each image of an image content block may be an element of the content block, and text may be considered as elements of an image content block.

A video content block may likewise be positioned anywhere in a smart template and/or a smart file. Likewise, there may be any number of video block layouts, such as, but not limited to, a single video content block, a multiple video content block, a video and text content block, a video and image content block, a video approval content block, a video selection content block, etc. In some implementations, each video of a video content block may be an element of the video content block, text of the content block may be one or more elements of a content block, etc. In some implementations, each frame of a video, or each keyframe of video, or groups of frames of a video content block may be an element of the video content block. In still other examples, the video content block may be a link to a video service (e.g., LOOM®, VIMEO®, CLIP®, etc.) that may be selected by a client to view a video.

In addition to the different types of content blocks 102A, other aspects of a content block, such as the font size, color, background color, etc., may be selected or specified by the vendor creating the content block.

A services block 102B may be utilized by a vendor to describe the products or services the vendor offers for sale. Within a services block 102B, a vendor may include, for example, a title of the service/product, a description of the service/product, an image or icon for the service/product, a price of the service product, a duration of the service, etc. Likewise, a services block 102B may also be configured to allow a viewer of the services block, when presented to a client as a smart file, to select one or more services offered by the vendor and/or the quantity of the service/product selected. In instances in which a vendor offers multiple services/products, multiple service blocks 102B may be included in a smart template 100A/100B and/or smart file. Like content blocks, each services block 102B may include any number of elements. For example, an element may be defined for a group of text, each word, the title, description, each image or icon, etc. As discussed further below, in some examples, changes to a services block 102B by the vendor may automatically cause changes to other linked blocks, such as an invoice block, a contract block, etc.

A scheduler block 102E may be utilized by a vendor and included in a smart template 100A/100B and/or smart file to allow a client interacting with a smart file to select a session or schedule time with the vendor. The scheduler block 102E may present dates, times, and/or durations that may be selected by a client when interacting with a presented smart file. As discussed further below, many blocks may interact and/or communicate with other blocks of a smart file. For example, a vendor may select that a client must schedule a session in the scheduler block 102E before they can navigate to another block 102 within a presented smart file. As another example, the scheduler block 102E may be configured so that a session can only be scheduled or reserved through the scheduler block 102E after the client has paid for services through an invoice block 102C of the smart file. Like the other blocks, the scheduler block 102E may include any number of elements. For example, each session, duration, day, etc., may be a different element of a scheduler content block 102E. An example of a scheduler block is discussed further with respect to FIG. 4A.

The invoice block 102C may be used to invoice a client for services/products described or selected within a smart file. The invoice block 102C of a smart file may be configured to receive from other blocks of the smart file, such as the content block 102A, services block 102B, scheduler block 102E, contract block 102D, etc., information that is dynamically used to complete portions of the invoice block 102C. In general, the invoice block 102C describes the services/products for which the client will be paying and the vendor will be providing, as well as any payment schedule, the methods of accepted payment, whether a gratuity, discounts, other service fees, etc., can be added, taxes, etc. In some implementations, the vendor and/or client may specify or select, through the invoice block, payment milestones, recurring invoices for payments, etc.

In addition to describing the services/products and other payment details, the invoice block 102C may also include a payment portion to facilitate payment by the client to the vendor for the selected services/products. Like the other blocks, the invoice block 102C may include any number of elements. For example, the date of the invoice may be an element, the price or fee may be an element, the payment terms, form of payment, taxes, etc., each may be different elements of the invoice block 102C. Likewise, if elements of blocks from which the invoice block receives information changes, that information may be automatically updated in the invoice block 102C. An example of an invoice block is discussed further with respect to FIG. 4C.

The contract block 102D may be used to present a contract that is executed between the vendor and the client for the services/products presented in the smart file and selected by the client. The contract block 102D may interact with other blocks of a smart file to dynamically receive information and populate portions of the contract block 102D. For example, information about the client (e.g., name, address, etc.) may be received from the content block 102A of the smart file and automatically included in the contract block 102D. Likewise, price, services/products selected, payment method, payment schedule, etc., may be received from the scheduler block 102E and/or invoice block 102C of the smart file and automatically be included in the contract block 102D. Likewise, if a change is made to one of the other blocks from which the contract block 102D receives information, the information may be automatically provided to and updated in the contract block 102D. The vendor and the user may then electronically sign the contract block 102D, thereby generating a contract between the vendor and the client for the services/products selected in the smart file that is generated from the smart template 100. Like the other blocks, the contract block 102D may include any number of elements. For example, each section or paragraph of the contract included in the contract block may be an element, each sentence may be an element, etc. An example of a contract block is discussed further with respect to FIG. 4B.

Like the content blocks, services blocks, scheduler blocks, invoice blocks, and contract blocks may be modified in font size, color, background color, etc.

As illustrated in FIG. 1A, a smart template 100A/100B may be arranged to have any number and/or types of content blocks 102. Likewise, the order in which content blocks are arranged in the smart template 100A/100B and presented in a resulting smart file may be easily altered by a vendor, either as part of creating the smart template or after creating the smart template, and even after generating smart files from the smart template 100. For example, in creating the smart template 100, the vendor may rearrange the order of the blocks by, for example, moving the scheduler block 102E up below the services block 102B, as illustrated by line 103A and moving the invoice block 102C down below the contract block 102D, as illustrated by line 103B, producing the rearranged smart template 100B.

As illustrated in FIG. 1B, the smart template 100B may be used to generate a plurality of different smart files. In this example, the smart template may be used to generate N number of smart files, each smart file specific to a client and including client information 121-A, 121-B, through 121-N. For example, and as discussed further below, when a client, such as client A 121-A, accesses a smart file and provides responses to the smart file (e.g., responding to questions, selecting services/products, specifying payment method, scheduling a session, signing a contract, etc.). the client provided information 121-A through 121-N is included in the smart file to create a smart file 122-A, 122-B, through 122-N specific to that client. As discussed further herein, the disclosed implementations may be used to quickly and efficiently detect changes to a smart file without having to actually process the entire smart file and, as determined necessary, present notifications and/or request for confirmations of those detected changes.

FIGS. 2A, 2B, 2C, and 2D illustrate an example transition diagram for generating smart files from a smart template, publishing the smart files, determining changes to smart files, and notifying a client of changes to the smart files, in accordance with disclosed implementations.

The smart file service 220 may provide the disclosed implementations to one or more vendors 201. Vendors 201 may include, but are not limited to, individuals, businesses, services, etc. Vendors 201 may be at any location and may be remote from the smart file service 220 and/or the clients 250. In some implementations, vendors 201 may subscribe to or pay the smart file service 220 to provide some or all of the disclosed implementations and/or other features and services, for example features and/or services that facilitate interaction between vendors 201 and clients 250. As discussed further below, in some implementations, a vendor 201 may create, through interaction with the smart file service 220, one or more smart templates and/or smart files. Likewise, as discussed further below, the smart file service 220 may utilize the disclosed implementations to determine changes between different instances of a smart file presented to a client and automatically determine and send a notification and/or request for confirmation to the client 250 and/or vendor 201 (and/or another party) upon detection of the change.

Clients 250 may include, but are not limited to, individuals, businesses, services, etc. Vendors 201 and clients 250 may interact with the smart file service 220, via the network 202, using one or more devices, such as laptops, desktops, mobile devices, tablets, etc. In some examples, the smart file service 220 may provide a mobile application that a vendor 201 and/or a client 250 may execute on a mobile device to interact with the smart file service 220, vendors 201, and/or clients 250. For example, a vendor 201, through use of a first mobile application executing on a first mobile device, may interact with the smart file service 220, generate/edit smart templates and/or smart files, correspond with clients, etc. Likewise, a client 250 may access the smart file service 220 via a second mobile application executing on a second mobile device, respond to questions in a smart file, make payments, sign contracts in a smart file, correspond with vendors, etc.

Smart files may be published, for example, through websites, such as vendor websites 211, through social media 213, through direct marketing 215, and/or through other channels. For example, a smart file may be published on and accessible to clients 250 through a website, such as a vendor website 211, short message service ("SMS"), electronic mail ("e-mail"), text message, mobile application, etc. Alternatively, or in addition thereto, the vendor 201 may publish social media 213 and/or other marketing 215 content that includes a link, or Uniform Resource Locator ("URL"), Quick Response ("QR") code, etc., that may be interacted with by one or more clients 250 to access a smart file.

As illustrated, a vendor 201 may interact with the smart file service 220, through a network 202, such as the Internet. For example, and as discussed herein, the vendor may select any number and arrangement of blocks to create a smart template, as in 203, and also indicate different portions of each block that are to be used to dynamically populate other portions of other blocks and which blocks must be completed, if any, before a client can proceed to other blocks. For example, the vendor 201 may specify that a response to a question block is to be used to populate the client 250 name in the invoice block and/or contract block. As another example, the vendor may specify that the service/product selected from the services block is to be used to populate portions of the invoice block and/or contract block. In other implementations, some or all of the connections and auto populations between blocks of a smart template may be determined by the smart file service.

Once a smart template is generated by a vendor 201, the smart file service 220 may generate and store a nested tree of hash values for the smart template, as in 204. For example, and as discussed further below, the smart file service 220 may use one or more hash functions to generate hash values for different portions of the smart template and generate a nested hash value tree using those hash values. As is known in the art, a hash function is any function that can be used to map data of arbitrary size to fixed-size values, known as hash values. When the data being hashed is unchanged, each time the hash function is used to map the data to hash values, the resulting hash values will be the same. However, if any portion of the data changes, when the data is hashed using the hash function, the resulting hash value also changes.

In one example, a first hash function may be used to generate, for each block of a smart template and/or a resulting smart file, a block hash value representative of that block of the smart file. In other implementations, the same or different hash function may be used to generate, for each element of each block of a smart file, an element hash value representative of each element of each block of a smart file. Similarly, the same or different hash function may be used to generate a smart file hash value for the entire smart file. The hash value generated for each element of each block, for each block of the smart file, and for the smart file may be stored in a data store accessible to the smart file service as representative of that instance of the smart template and/or smart file.

Figure 3:
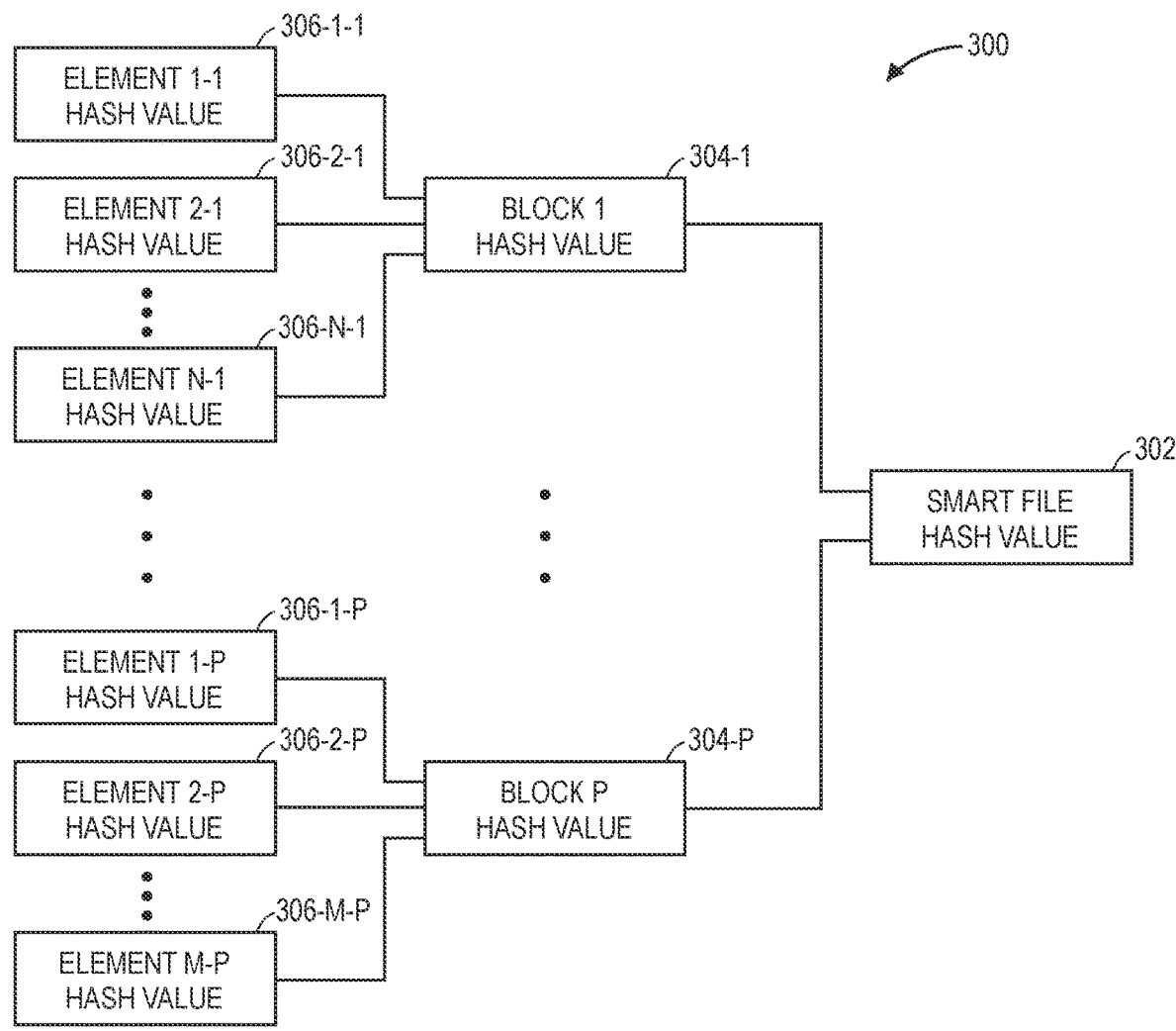
FIG. 3 is a block diagram of a nested hash value tree for a smart file, in accordance with disclosed implementations.

Referring to FIG. 3, illustrated is a block diagram of a nested hash value tree 300 generated for an instance of a smart template or an instance of a smart file, in accordance with disclosed implementations.

As discussed, a smart file may include any number of blocks and each block may include any number of elements. With the disclosed implementations, the smart file service, upon generation of a smart file (or a smart template) may generate an element hash value for each element of each block, a block hash value for each block of the smart file, and a smart file hash value for the smart file as a whole. For example, a first hash function may be used to generate an element hash value for each element of each block of a smart file. In the illustrated example, a first hash function may be used to generate an element 1-1 hash value 306-1-1 for element 1-1 of block 1 of a smart file, an element 2-1 hash value 306-2-1 for element 2-1 of block 1 of the smart file, through an element N-1 hash value 306-N-1 for element N-1 of block 1 of the smart file. This may be done for each element of each block of the smart file up through block P in which the same or different hash function may be used to generate an element 1-P hash value 306-1-P for element 1-P of block P of the smart file, an element 2-P hash value 306-2-P for element 2-P of the block P of the smart file, through an element M-P hash value 306-M-P for element M-P of block P of the smart file. Each of the element hash values may be stored in a data store accessible to the smart file service and associated with the instance of the smart file and the corresponding element for which the element hash value is representative. As discussed further below, in some implementations, not all elements of a block of a smart file may be hashed. For example, it may be determined that some elements of a block do not need to be monitored for changes. In such an instance, element hash values may not be generated for those elements.

In addition to generating element hash values for each element of each block of a smart file, the same or different hash function may be used to generate block hash values representative of each block of the smart file. In the illustrated example, a second hash function may be used to generate a block 1 hash value 304-1 for block 1 of the smart file. This may be done for any number of blocks included in the smart file, up through block P of the smart file, for which the second hash function generates a block P hash value 304-P for block P of the smart file. Like the element hash values, each of the block hash values may be stored in the data store and associated with the instance of the smart file and the corresponding block for which the block hash value is representative. Likewise, an association between each block hash value and corresponding element hash value for elements of the block may also be maintained in the data store, as illustrated in FIG. 3. For example, an association between block 1 hash value 304-1 may be maintained with each of element 1-1 hash value 306-1-1, element 2-1 hash value 306-2-1, through element N-1 hash value 306-N-1. Likewise, an association between block P hash value 304-P may be maintained with each of element 1-P hash value 306-1-P, element 2-P hash value 306-2-P, through element M-P hash value 306-M-P.

In some implementations, the block hash value may be generated based on the contents of all elements of the block and/or the entire block. In other implementations, the block hash value may be generated based only on the content of elements for which a corresponding element hash value was generated. For example, if there are four elements of a block and element hash values are only generated and maintained for three of those four elements, in some implementations, the block hash value may be generated based on only the three elements of the block for which an element hash value was generated, ignoring the content of the fourth element of the block for which no element hash value was generated. Still further, in some implementations, if a block includes only elements for which no hash values were generated, a block hash value may not be generated for that block.

Finally, in addition to generating element hash values for one or more elements of one or more blocks of a smart file and generating block hash values for one or more blocks of the smart file, the same or different hash function may be used to generate a smart file hash function representative of the instance of the smart file. In the illustrated example, a third hash function may be used to generate a smart file hash value 302 for the smart file. Like the block hash values and the element hash values, the smart file hash value may be stored in the data store. Likewise, an association between the smart file hash value and each block hash value may also be maintained in the data store, as illustrated in FIG. 3. For example, an association between smart file hash value 302 and block 1 hash value 304-1 may be maintained and an association between the smart file hash value 302 and block P hash value 304-P may be maintained. As will be appreciated, a link or association, as illustrated in FIG. 3, between each element hash value and each block hash value, and between each block hash value and the smart file hash value may be maintained for each of the generated hash values to from a nested hash value tree 300 for the smart file.

Similar to the block hash value, in some implementations, the smart file hash value may be based on the entire content of the smart file. In other implementations, the smart file hash value may be generated only based on the content of blocks of the smart file for which a block hash value has been generated, ignoring the content of other blocks of the smart file for which a block hash value was not generated. In still other examples, a smart file hash value may not be generated at all and all processing to detect changes may be performed starting at the block hash value level.

Likewise, while the examples discussed herein describe three layers of the nested hash value tree structure, it will be appreciated that additional or fewer layers may be utilized with the disclosed implementations.

Returning to FIG. 2A, upon generation of a smart template, the vendor 201, through interaction with the smart file service 220 may generate and publish or send a smart file using the smart template and that smart file may be sent, presented to, or otherwise provided to or accessible by one or more clients 250, as in 206. For example, upon generation of a smart file, the smart file service 220, upon receiving instruction from the vendor 201, may publish the smart file through one or more of social media 213, marketing 215, and/or the vendor website 211 so that it is accessible to one or more clients 250. In other examples, a smart file may be created for each client 250. For example, if a client interacts with a published link for a smart file, upon interaction with that link, the smart file service 220 may generate a smart file, using the created smart template, that is specific between that client and the vendor. In another example, the vendor may use the smart template, or manually create through selection of one or more blocks, a smart file that is sent to a specific client so that the smart file is specific between the vendor and that specific client. Accordingly, any number of smart files that are specific between the vendor and a particular client, may be generated through a smart template and/or created using any number of blocks, as discussed herein.

Figure 2A:
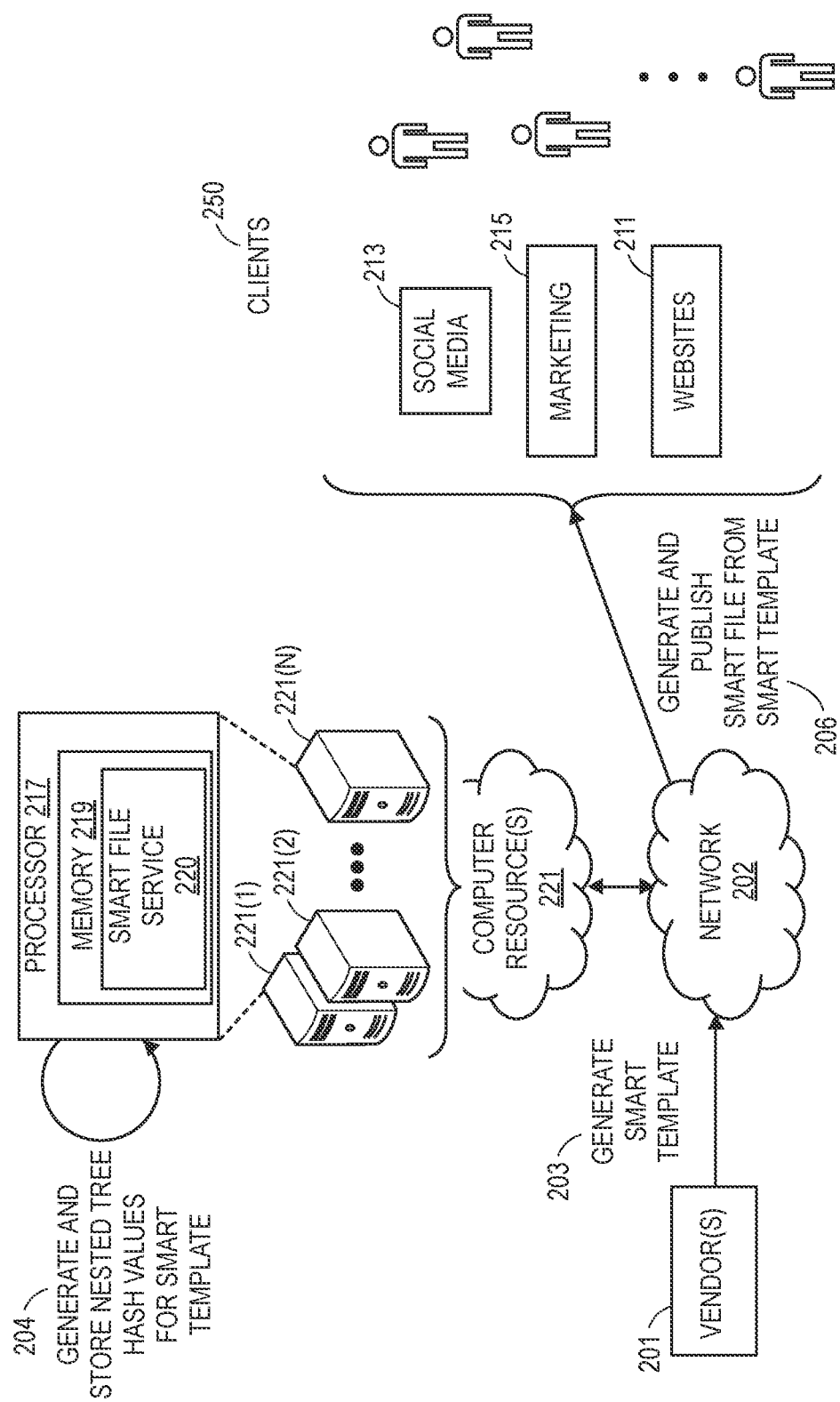
Figure 2B:
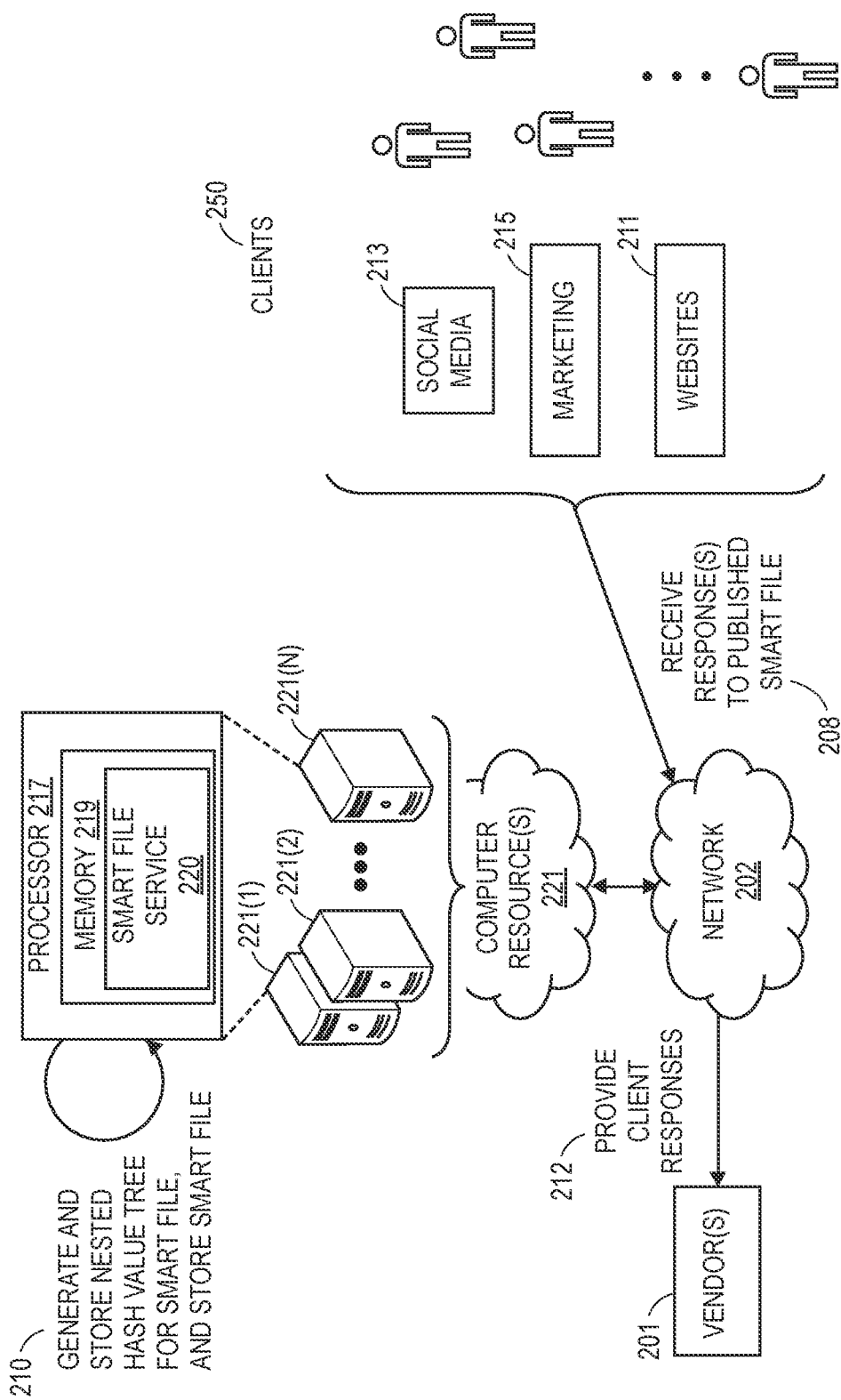

Turning now to FIG. 2B, a client interacting with or accessing a smart file may at some point provide responses to one or more portions of the smart file, as in 208, such as selection of a product or service, selection of a scheduled session, response to questions, etc. Upon receiving responses from a client 250 accessing a smart file, the smart file service 220 creates an association between the client and the smart file and generates and stores a nested hash value tree for the smart file, as in 210, that includes an element hash value for each of one or more elements of one or more blocks of the smart file, a block hash value for each of one or blocks of the smart file, and, optionally, a smart file hash value for the smart file, as discussed above, as discussed with respect to FIG. 3, and as discussed further herein. In addition, the smart file with the client responses is stored in the data store as the stored smart file and the responses, or the stored smart file, is also provided back to the vendor, or a notification of the smart file is sent, so the vendor can review the responses provided by the client, as in 212.

Referring now to FIG. 2C, in some examples, after a smart file that includes responses from a client 250 has been created, the vendor 201 may make one or more changes to the smart file, as in 214. For example, the vendor 201 may correct a typo in one of the text blocks of the smart file, the vendor may change a term of service in the services block, etc. As other examples, and not by way of limitation, after the vendor 201 talks with the client 250 during which they agree to different payment amounts, different services/products, etc., those discussed changes may be updated in the smart file by the vendor. In still other examples, the vendor 201 may modify a master block or smart template that dynamically updates all smart files that exist that were created from the smart template and/or that include that master block. For example, the vendor 201 may define a master services block that, when updated, any changes are propagated to all smart templates and/or smart files that include that master services block. As a brief example, the vendor may define a master services block that includes, among other information, the vendor logo and mission statement. If the vendor updates the vendor logo and/or mission statement in the master services block, those changes may be propagated to all smart templates and smart files that include that master services block.

While the example discussed with respect to FIG. 2C describes a vendor making a change to a smart file, in some implementations, the change may be made by the client that is associated with the smart file. For example, after the client has provided responses to a smart file and the smart file has been hashed, in accordance with the disclosed implementations, and sent back to the vendor, the client may access the smart file and make additional changes and/or propose additional changes to the smart file.

At some point after a change to a smart file has occurred, thereby creating a current instance of the smart file that is different than the stored instance of the smart file, the smart file service 220 may hash the smart file using a hash function to generate a current smart file hash value of the current instance of the smart file. In some examples, the smart file service 220 may periodically generate current smart file hash values of all smart files and compare those current smart file hash values with corresponding stored smart file hash values to determine if a smart file has changed. In other examples, the smart file service 220 may generate a current smart file hash value of a smart file after any access of the smart file (e.g., access by the client 250 and/or vendor 201) has completed. In implementations in which no smart file hash value is generated, block hash values may be generated and compared to corresponding stored block hash values to determine if one or more blocks of the smart file have changed.

Regardless of when or why the current smart file hash value is generated, the current smart file hash value and/or current block hash values are compared with the stored smart file hash value and/or stored block hash values for that smart file, as in 216. If the current smart file hash value and/or current block hash values are different than the stored smart file hash value and/or stored block hash values, the smart file service 220 knows that the smart file has changed in some respect. As discussed further below, upon determination that the smart file has changed, rather than processing the entire smart file to determine the actual change that has occurred, which could require significant processing time and cost, each block of the smart file may be hashed to determine current block hash values for each block of the current instance of the smart file. Those current block hash values are then compared to the stored block hash values for the smart file to determine which block or blocks of the smart file have changed. For blocks in which the current block hash value is the same as the stored block hash value, it is determined that those blocks of the smart file are unchanged. In comparison, for each block in which the current block hash value is different than the stored block hash value, it is determined that some portion of that block of the smart file has changed.

In some examples, before generating hash values for each of one or more elements of one or more blocks of the current instance of the smart file that are determined to have changed, it may be determined if the block is of a type that requires notification and/or confirmation of acceptance of the change, as in 218. For example, in some implementations, the invoice block may be defined as a block that requires confirmation of any change that occurs to the block. In comparison, the services block may not be defined as a block that always requires confirmation of a change to the block.

If it is determined that the changed block requires notification, the current instance of the block may be processed and compared with the stored instance of the block, without processing other portions of the smart file, to determine the actual change that occurred to that block and a notification and/or request for confirmation may be sent to the client indicating the actual change that occurred to that block of the smart file.

If it is determined that the changed block is not defined as a block that automatically requires notification and/or confirmation of a change, each element of the changed blocked for which a stored element hash value is maintained may be hashed with a hash function to generate current element hash values for the elements of the changed block of the current instance of the smart file. Those current element hash values may then be compared to the stored element hash values to determine which elements of the changed block have changed and which elements of the changed block have not changed. As discussed above, change between elements can be quickly and efficiently determined based on a comparison of the current element hash values and the stored element hash values for that changed block. If the current element hash value matches the stored element hash value, that element of the changed block remains unchanged and does not need further consideration or processing. However, if the current element hash value and the stored element hash value are different, it is known that some portion of that element of the changed block has changed.

In this example, the changed element(s) of the changed block(s) may then be processed to determine the actual change to the element(s) of the smart file, without accessing or processing other elements and/or blocks of the smart file. For example, the changed element(s) of the changed block(s) of the current instance of the smart file may be processed and compared with the prior instances of those elements that are maintained in a data store to determine the actual changes that have occurred to the smart file between the current instance of the smart file and the prior instance of the smart file.

By progressing through the nested hash values tree of the smart file, rather than comparing the entire current instance of the smart file with the entire prior instance of the smart file provides a technical improvement over existing systems by reducing the compute power and time needed to determine changes to a smart file.

The smart file service may then consider each determined actual change to the changed element(s) of the changed block(s) of the current instance of the smart file and determine whether a notification without request for confirmation of the change is needed for the change (referred to herein as a "notification"), whether a notification with a request for confirmation of the change is needed (referred to herein as a "request for confirmation"), or whether no notification is needed. Any of a variety of techniques may be used to determine the level of action to be performed for each determined change and those determinations may be different for different smart file, different blocks, different elements of different blocks, different vendors, different clients, etc. Likewise, in some implementations, in addition to some blocks being defined as automatically requiring a notification and/or a request for confirmation, in some examples, some elements of a block may be defined as automatically requiring a notification and/or a request for confirmation for any change to that element. For example, in some implementations, the invoice block may not require an automatic notification and/or request for conformation to the invoice block, but the elements of price, services/products, of payment terms, may be defined as requiring a request for confirmation for any changes to those elements of the invoice block.

If it is determined that a notification or request for confirmation is required based on the change(s) determined for the smart file, the notification or request for confirmation is sent to the client 250 and/or the vendor 201, as in 219. In the illustrated example, the vendor changed the smart file and a notification or request for confirmation of the actual change(s) to the smart file is sent to the client. However, in other examples, the smart file service may determine who made the actual change(s) to the smart file (e.g., based on who last accessed the smart file) and send the notification or request for confirmation of the change to the non-changing party.

Figure 2D:
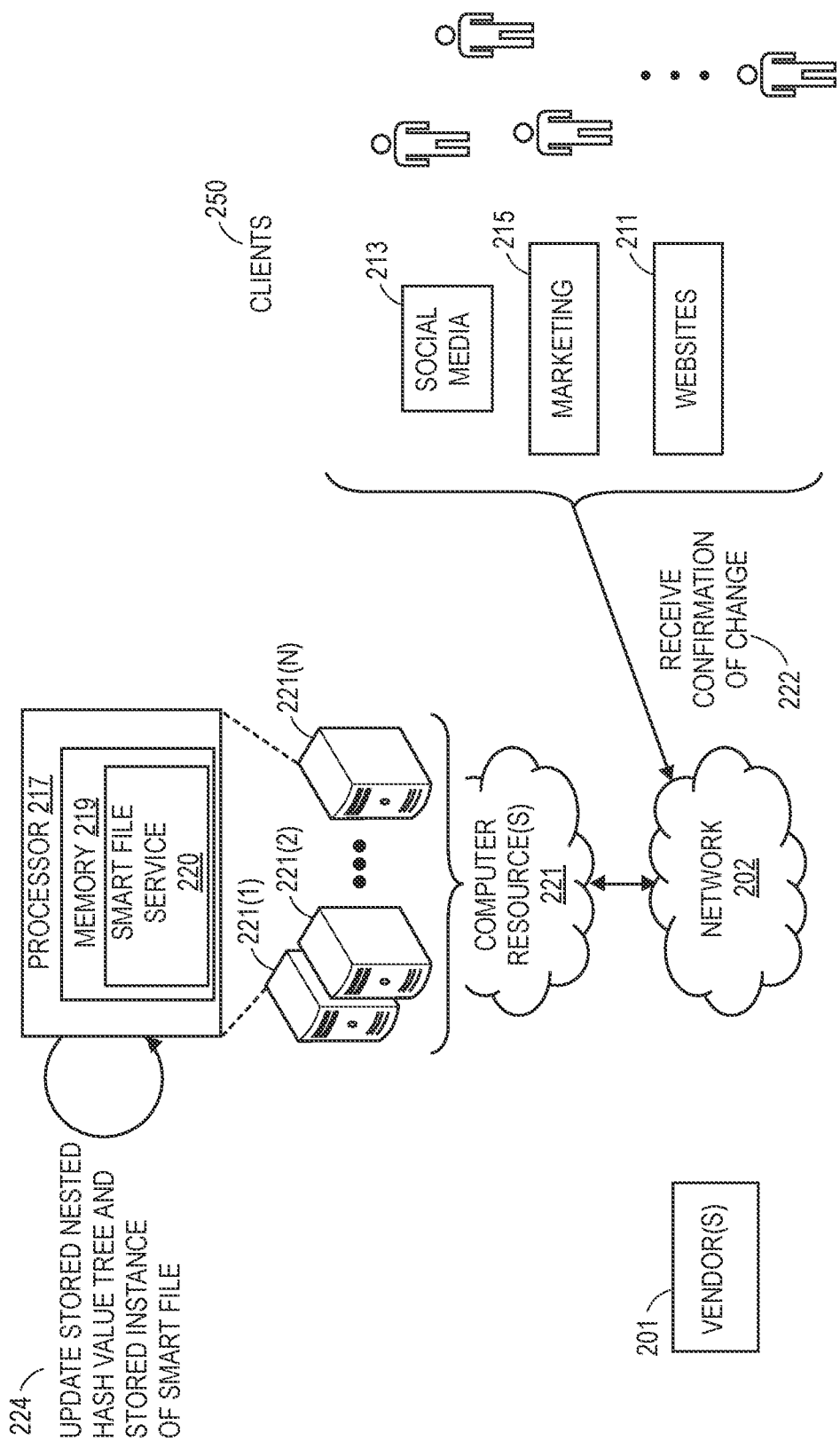

Referring now to FIG. 2D, after receiving confirmation of the change, as in 222, after providing notification if only notification is determined to be necessary, or after determining that no notification is necessary, the smart file service 220 updates the stored nested hash values tree for the smart file with the hash values determined for the current instance of the smart file and updates the stored instance of the smart file, as in 224.

If the change is not confirmed, the vendor 201 and client 250 associated with the smart file may be notified and work together to reach agreement as to the appropriate change that is to be made to the smart file. In some examples, the prior instance of the smart file, before the change, may be maintained as the current instance of the smart file, until/if the vendor and client agree to another change.

Some or all interactions between vendors 201, the smart file service 220, and/or the clients 250 may be conducted through a network 202, such as the Internet.

The system may also include computing resource(s) 221. The computing resource(s) 221 may be remote from the vendors 201 and/or the clients 250. Likewise, the computing resource(s) 221 may be configured to communicate over a network 202 with the vendors 201 and/or clients 250. Likewise, websites 211, social media 213, and/or direct marketing 215 may also be transmitted and/or hosted over the network 202.

As illustrated, the computing resource(s) 221 may be implemented as one or more servers 221(1), 221(2), . . . , 221(N) and may, in some instances, form a portion of a network-accessible computing platform implemented as a computing infrastructure of processors, storage, software, data access, and so forth that is maintained and accessible by components/devices of the system via a network 202, such as an intranet (e.g., local area network), the Internet, etc. The computing resources 221 may process smart templates, smart files, blocks, and/or elements to generate corresponding hash values, nested hash value trees for smart files, and to efficiently determine a block(s) and/or element(s) of a smart file that have changed between instances of the smart file, without having to process the entire smart file, as discussed herein.

The server system(s) 221 does not require end-user knowledge of the physical location and configuration of the system that delivers the services. Common expressions associated for these remote computing resource(s) 221 include "on-demand computing," "software as a service (SaaS)," "platform computing," "network-accessible platform," "cloud services," "data centers," and so forth. Each of the servers 221(1)-(N) include a processor 217 and memory 219, which may store or otherwise have access to a smart file service 220, as described herein.

The network 202, and each of the other networks discussed herein, may utilize wired technologies (e.g., wires, USB, fiber optic cable, etc.), wireless technologies (e.g., radio frequency, infrared, NFC, cellular, satellite, Bluetooth, etc.), or other connection technologies. The network 202 is representative of any type of communication network, including data and/or voice network, and may be implemented using wired infrastructure (e.g., cable, CAT6, fiberoptic cable, etc.), a wireless infrastructure (e.g., RF, cellular, microwave, satellite, Bluetooth, etc.), and/or other connection technologies.

FIG. 4A is an example illustration of a scheduler block 402E that may be included in a smart template and/or a smart file, in accordance with disclosed implementations.

As illustrated, the scheduler block 402E may include multiple elements, such as a title element 412A, a text element 412B, session frequency element 412C, session length element 412D, specific time element 412E, calendar element 412F, session duration element 412G, current date element 412H, and client name element 412I. As will be appreciated, additional and/or fewer elements may be included in the scheduler block 402E.

A client, when accessing a smart file and the scheduler block 402E of the smart file, may interact with different elements of the scheduler block 402E. For example, the client may select a session duration from the session duration element 412G. For example, the session duration element 412G may include a drop-down list of options, such as two months, four months, six months, eight months, etc., and the client may select the duration of the service. Likewise, in some instances, the frequency element 412C may be automatically adjusted based on, for example, the selection made in the session duration element 412G. In the illustrated example, the client has selected a session duration of six months and the frequency element 412G has been updated to indicate that sessions will occur monthly. In other examples, other frequencies for the sessions may be selected or determined.

As will be appreciated any variety of elements may be included in the scheduler block 402E that may be interacted with and selected by the client. Likewise, some elements of the scheduler block may be automatically populated with client information provided by the client in other blocks of the smart file and/or automatically populated with other information. For example, the client name element 412I may be automatically populated with the client name provided by the client in an element of a different block of the smart file, such as a content block. Likewise, if the client updates the client name in the client name element 412I of the scheduler block, that updated client name may be automatically populated to other elements of other blocks of the smart file that are linked to that client name element 412I. As another example, the date element 412H may be automatically populated with the current date during which the client is accessing the smart file.

As the client interacts with the scheduler block 402E, the current instance of the smart file is updated to include the client provided responses as part of the smart file.

FIG. 4B is an example illustration of a contract block 402D that may be included in a smart template and/or a smart file, in accordance with disclosed implementations.

Like the scheduler block, the contract block may include a plurality of elements 414A, 414B, 414C, 414D, 414F, 422A, 422B. In the example contract block 402D, the elements 414A through 414F may be automatically populated based on the client provided selections received through the scheduler block 402E (FIG. 4A). For example, the client element 414C of the contract block 402D may be linked with the client element 412I of the scheduler block 402E (FIG. 4A) and the data provided in the client element 412I may be automatically populated in the client element 414C of the contract block 402D. As another example, the first session date element 414B, the duration element 414F, and the frequency element 414D may be linked to the calendar element 412F, the duration element 412G, and the frequency element 412C of the scheduler block 402E (FIG. 4A), respectively, and the client responses provided by the client while interacting with the scheduler block 402E, may be automatically populated into the linked elements of the contract block 402D.

In addition to elements of the contract block that may be updated with responses from the client, other elements, such as the fee element 422A and the payment schedule element 422B of the contract block 402D may be specified by the vendor. As discussed, element hash values may be generated for each element of a block, such as elements 414A, 414B, 414C, 414D, 414F, 422A, 422B, and used to determine if the element of the block has changed.

FIG. 4C is an example illustration of an invoice block 402C that may be included in a smart template and/or a smart file, in accordance with disclosed implementations.

Like the scheduler block 402E and the contract block 402D discussed above with respect to FIGS. 4A and 4B, respectively, the invoice block 402C may include a plurality of elements 434A, 434B, 434C, 434D, 434E, each of which may be hashed so that an element hash value is stored for each element and used to determine if an element of the invoice block has changed, in accordance with the disclosed implementations.

In the illustrated example, the invoice block 402C includes duration elements 434A, a frequency element 434B, a total cost element 434C, a payment schedule amount element 434D and a payment schedule date element 434E. As will be appreciated, additional or fewer elements may be included in the invoice block 402C. In the illustrated example, each of the elements 434A through 434E are automatically populated based on responses provided by the client when interacting with other elements of the smart file. For example, the duration elements 434A and the frequency element 434B may be automatically populated with responses provided by the client when interacting with the linked elements of the scheduler block 402E and/or the contract block 402D. Similarly, the total cost element 434C may be calculated based on the responses provided by the client when interacting with the scheduler block and/or the contract block, the payment schedule amount element 434D and the payment schedule date element 434E may be determined based on responses provided by the client when interacting with the scheduler block elements and/or the contract block elements and based on the elements completed by the vendor (e.g., fee element 422A and payment schedule element 422B).

For each of the blocks and elements illustrated in FIGS. 4A through 4C, block hash values and element hash values may be generated and stored in a nested hash value tree for the smart file that contains those blocks and elements. Likewise, as discussed herein, the disclosed implementations may use the hash values of the nested hash value tree to quickly and efficiently determine which portions of a smart file have changed, without having to actually access or process the entire smart file.

Figure 5:
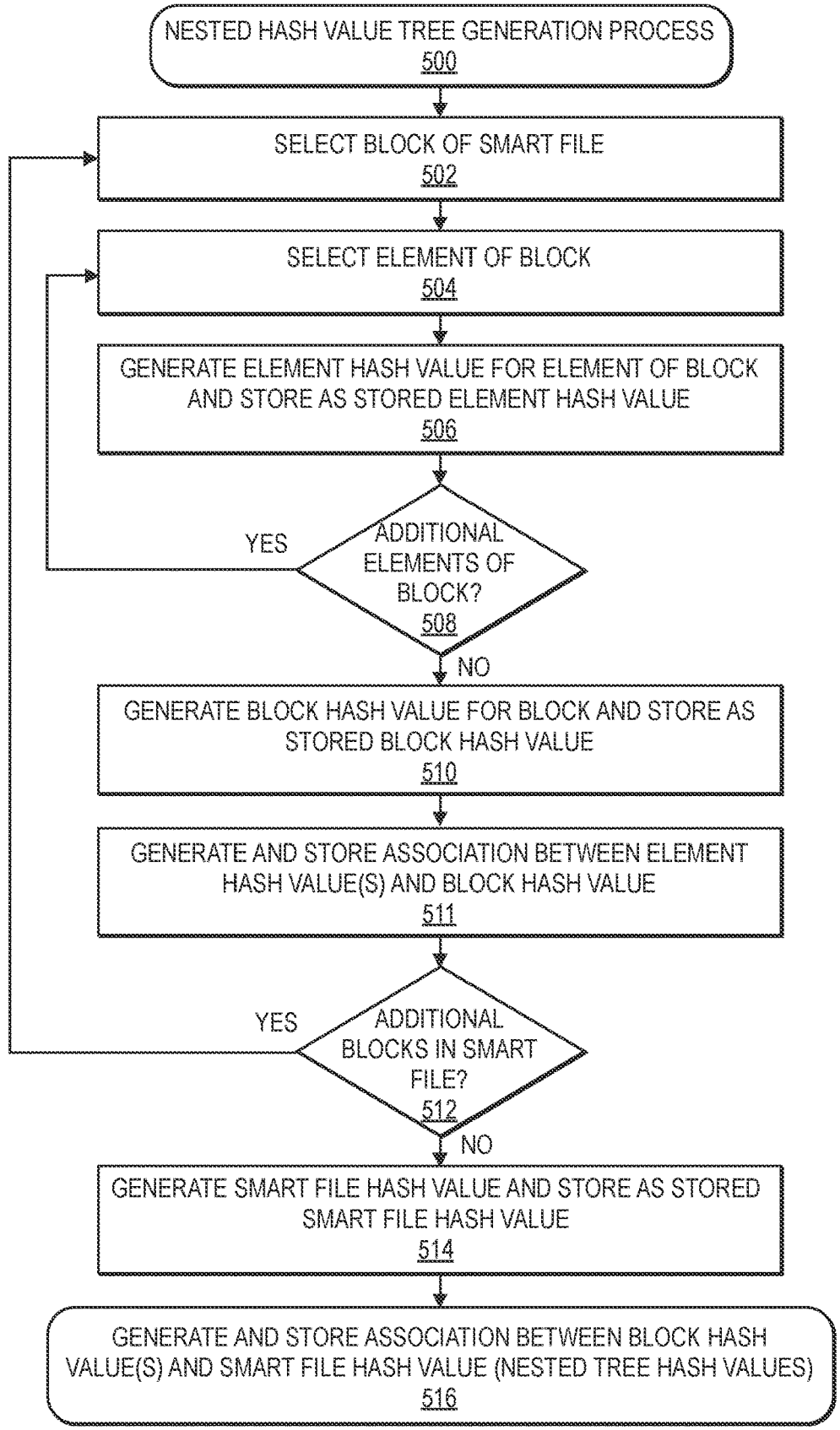
FIG. 5 is an example nested hash value tree generation process, in accordance with disclosed implementations.

FIG. 5 is an example nested hash value tree generation process 500, in accordance with disclosed implementations. The example process 500 may be performed periodically for a smart file and/or a smart template, may be performed at random intervals, in response to an access to a smart file, etc. Likewise, the example process 500 may be utilized with any or all smart files and/or smart templates maintained by a smart file service.

The example process 500 begins by selecting a block of a smart file, as in 502. As discussed herein, a smart file may contain one or more of any of a variety of blocks, such as content blocks, services blocks, scheduler blocks, contract blocks, invoice blocks, etc.

Upon selection of a block of a smart file, an element of the selected block is selected, as in 504. As discussed, a block may include one or more elements. An element may represent the entire block or multiple elements may constitute a block. As discussed above, in some implementations, some elements and/or blocks of a smart file may not be included in the example process 500 such that not all elements and/or blocks of a smart file are processed to generate a hash value. For example, one or more elements of a block may include content that does not need to be monitored for changes. In such an example, the one or more elements of that block may not be selected and processed by the example process 500. Likewise, if no elements of a block are processed by the example process 500, the block may also be excluded from the example process 500.

In some implementations, as part of smart file creation and/or smart template creation, elements and/or blocks may be designed or identified as to whether they are to be monitored for changes. Accordingly, the example process 500 may determine an element or block to select as part of the example process 500 based on whether that element and/or block has been indicated as an element and/or block that is to be monitored for changes.

An element hash value is then generated for the selected element of the selected block of the smart file and stored as a stored element hash value that is representative of that selected element, as in 506. As discussed above, any hash function may be used to generate the element hash value. In some implementations, a first hash function may be used to generate hash values for elements, a second hash function may be used to generate block hash values for blocks, and a third hash function may be used to generate a smart file hash value for the smart file. In other implementations, the same hash function may be used to generate hash values for each of the elements, blocks, and smart file.

After generating the element hash value for the selected element, a determination is made as to whether additional elements of the selected block remain for which element hash values are to be generated, as in 508. If it is determined that additional elements of the selected block remain, the example process 500 returns to block 504, selects a next element of the selected block, and continues. If it is determined that an element hash value has been generated for each element of the selected block for which an element hash value is to be generated, a block hash value for the selected block is generated and stored as a stored block hash value representative of the selected block, as in 510. In some implementations, the entire content of the block may be used to generate the block hash value. In other implementations, only contents of the elements of the block that are used to generate element hash values may be used to generate the block hash value.

Additionally, an association between each of the stored element hash values and the stored block hash value is generated and stored, thereby forming part of the nested hash value tree of the smart file, as in 511.

A determination is then made as to whether additional blocks of the smart file remain for which hash values are to be generated, as in 512. If it is determined that additional blocks of the smart file remain, the example process 500 returns to bock 502, selects a next block of the smart file, and continues. If it is determined that block hash values have been created for each block of the smart file for which a block hash value is to be generated, a hash function may be used to generate a smart file hash value for the smart file and the smart file hash value is stored in a data store as a stored smart file hash value, as in 514. In some implementations, the entire smart file may be mapped to generate the smart file hash value. In other implementations, only content of blocks of the smart file for which block hash values were generated may be mapped to generate the smart file hash value.

Finally, an association between the smart file hash value and each block hash value representative of each block of the smart file is generated and stored, thereby completing the nested hash value tree, as in 516. As noted above, in some implementations, a smart file hash value may not be generated for the smart file and the nested hash value tree may only include the element hash values and the block hash values for the smart file.

While the example process 500 discussed with respect to FIG. 5 describes processing blocks and elements in series to generate hash values, in other implementations, some or all of the example process 500 may be performed in parallel.

Figure 6:
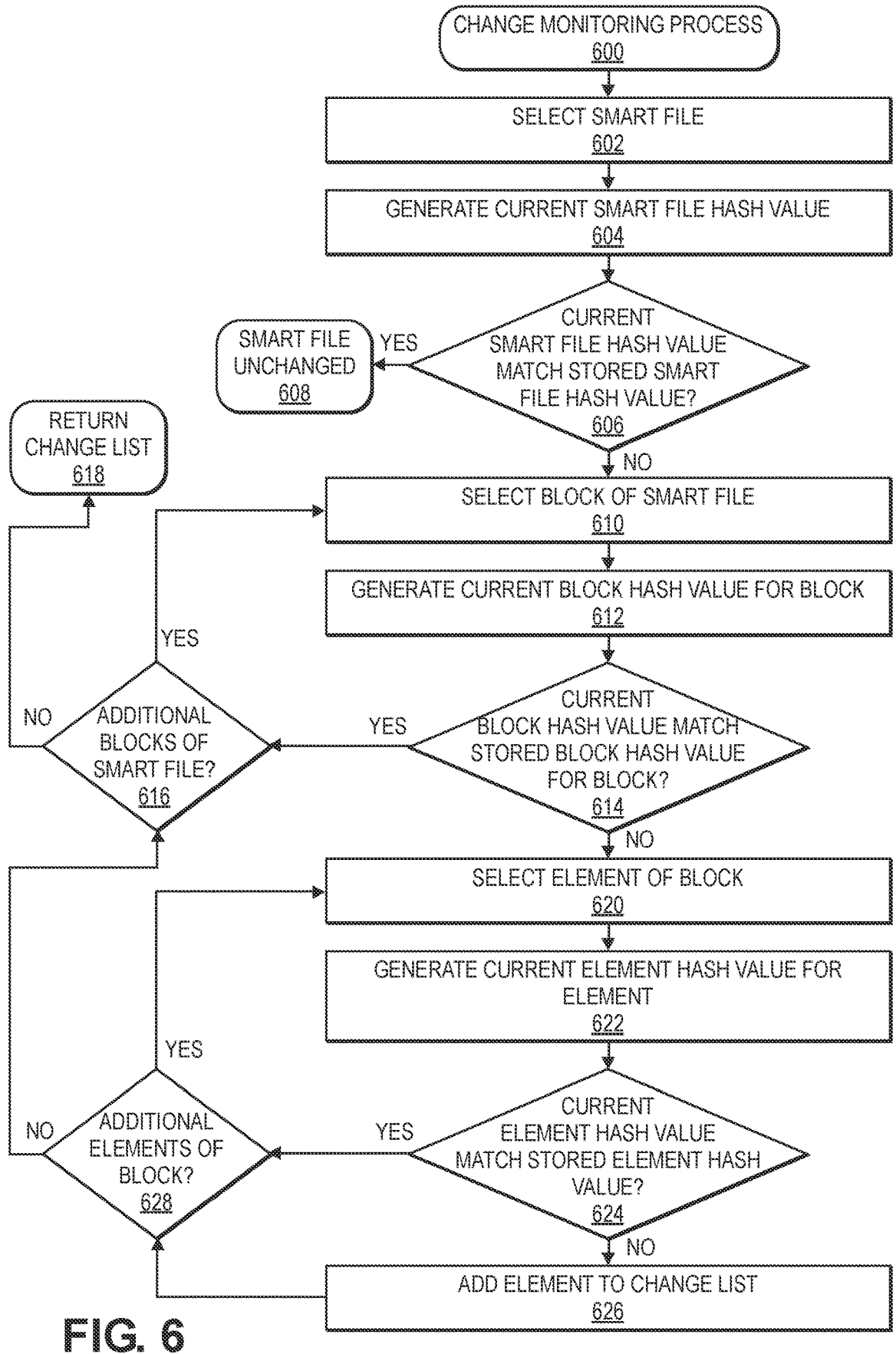
FIG. 6 is an example change monitoring process, in accordance with disclosed implementations.

FIG. 6 is an example change monitoring process 600, in accordance with disclosed implementations. The example process 600 may be performed periodically, randomly, in response to an access to a smart file completing, upon request, etc.

The example process 600 begins by selecting a smart file, as in 602. For the selected smart file, a hash function is used to generate a current smart file hash value of the current instance of the selected smart file, as in 604. As discussed above, in some implementations, the entire smart file may be mapped and used to generate the smart file hash value of the current instance of the smart file. In other implementations, only the content of blocks of the current instance of the smart file for which block hash values were generated may be mapped by the hash function to generate the current smart file hash value.

The current smart file hash value is then compared to the stored smart file hash value for the smart file to determine if the current smart file hash value matches the stored smart file hash value for the smart file, as in 606. If it is determined that the current smart file hash value matches the stored smart file hash value, the smart file is determined to be unchanged, and the example process 600 completes, as in 608.

If it is determined that the current smart file hash value and the stored smart file hash value for the smart file do not match, a block of the smart file for which a block hash value is maintained is selected, as in 610. In some implementations, any block of the smart file that has a corresponding stored block hash value may be selected. In other implementations, blocks that are defined as requiring a notification or a request for confirmation may be selected first. In still other examples, each block of the smart file may be processed in parallel. In still other examples, in some implementations, steps 604 through 608 may be omitted and the example process may begin with block 610.

For the selected block of the smart file, a current block hash value is generated by a hash function, as in 612. In some implementations, the entire block may be mapped and used to generate the current block hash value. In other implementations, only the content of elements of the block that are indicated in the nested hash value tree may be mapped by the hash function to generate the current block hash value.

The current block hash value is then compared to the stored block hash value for the selected block to determine if the current block hash value and the stored block hash value match, as in 614. If it is determined that the current block hash value and the stored block hash value match, it is determined that the block of the smart file is unchanged, and a determination is made as to whether there are additional blocks of the smart file that are to be processed by the example process 600, as in 616. If it is determined that there are additional blocks of the smart file to process, the example process 600 returns to block 610, selects a next block, and continues. If it is determined that there are no additional blocks of the smart file to process, a change list generated by the example process 600 is returned and the example process 600 completes, as in 618.

Returning to decision block 614, if it is determined that the current block hash value does not match the stored block hash value for the selected block, an element of the of the selected block for which a stored element hash value is maintained is selected, as in 620. Similar to processing of blocks, elements may be randomly selected, selected based on their notification requirements, or processed in parallel by the example process 600.

The selected element is then mapped by a hash function to generate a current element hash value, as in 622. In some implementations, the entire element may be mapped and used to generate the current element hash value.

The current element hash value is then compared to the stored element hash value for the selected element of the selected block to determine if the current element hash value matches the stored element hash value for the selected element of the selected block, as in 624. If it is determined that current element hash value and the stored element hash value match, the element is unchanged, and a determination is made as to whether there are additional elements of the selected block that are to be processed by the example process 600, as in 628. If it is determined that there are additional elements of the selected block to process, the example process 600 returns to block 620, selects a next element of the selected block, and continues. If it is determined that there are no additional elements of the selected block to process, the example process 600 returns to block 616 and continues.

Returning to decision block 624, if it is determined that the current element hash value does not match the stored element hash value for the selected block, the element is added to a change list generated by the example process 600 that indicates all elements of all blocks of the smart file that are determined, based on a comparison of current element hash values with corresponding stored element hash values, to have changed, as in 626. The example process 600 then returns to block 628 and continues.

Figure 7:
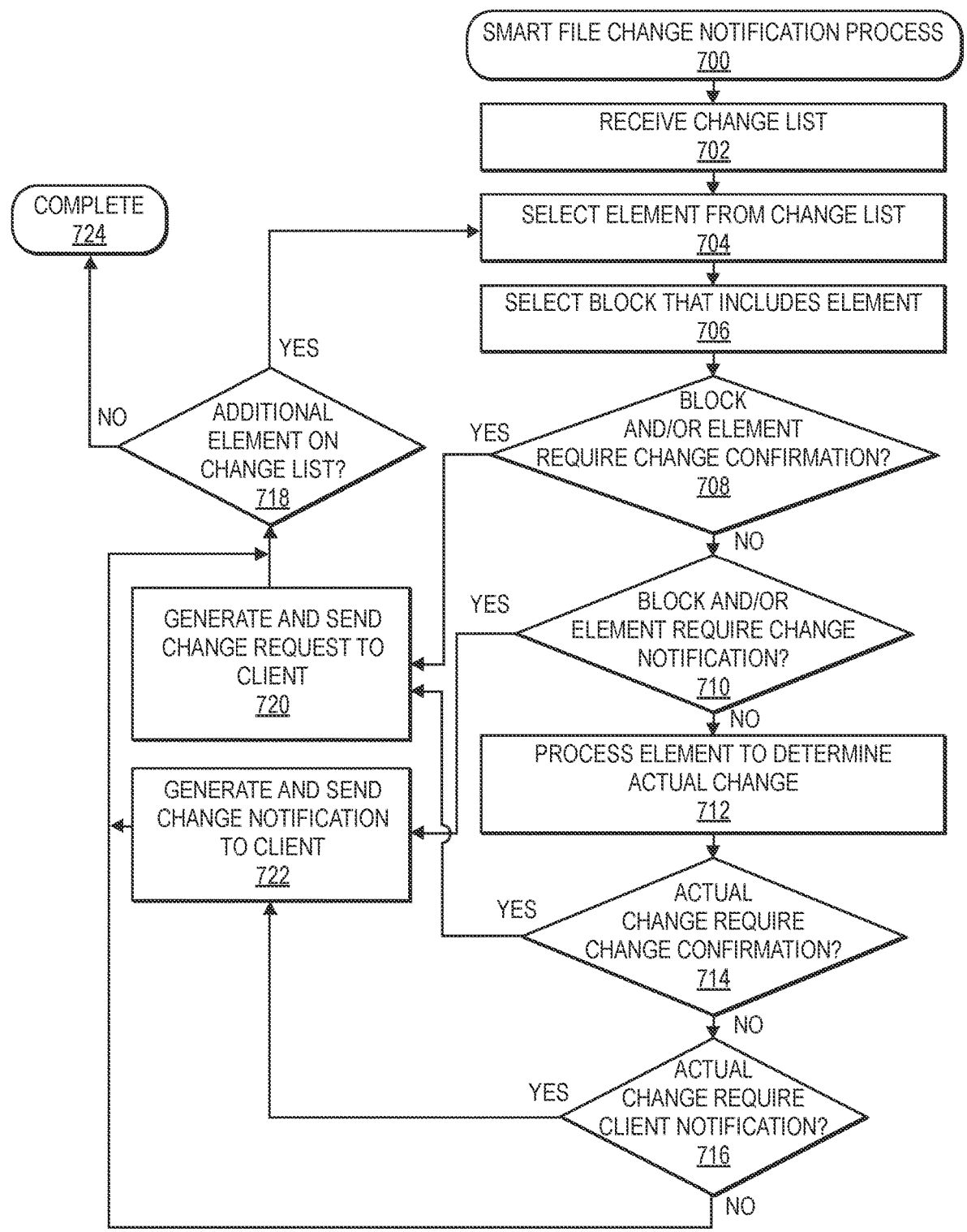
FIG. 7 is an example smart file change notification process, in accordance with disclosed implementations.

FIG. 7 is an example smart file change notification process 700, in accordance with disclosed implementations. The example process 700 may be performed in response to generation of a change list by the example process 600 (FIG. 6). The example process 700 may be performed in implementations when only a vendor may make changes to a smart file.

The example process 700 begins upon receipt of a change list for a current instance of a smart file, as in 702. An element indicated in the change list may then be selected, as in 704. A block that contains the selected element may then be selected, as in 706, and, in some implementations, a determination is made as to whether the block and/or the element are defined as requiring a change confirmation for any change to the block and/or element, as in 708. As discussed above, some blocks and/or elements, may be defined as requiring a change confirmation for any change to the block and/or element.

If it is determined that the block and/or element is defined as requiring a change confirmation, the block and/or element included in the current instance of the smart file may be processed with the corresponding block and/or element of the stored instance of the smart file to determine the actual change that occurred to the block and/or element and a change request generated and sent to the client for confirmation or approval of the change to the block and/or element, as in 720.

After generating and sending the change request to the client (720), after generating and sending a notification to the client (722), or after determining that a notification is not required (716) for the change, a determination is made as to whether any additional elements are indicated on the change list, as in 718. If it is determined that there are additional elements on the change list, the example process 700 returns to block 704, selects a next element from the change list, and continues. If it is determined that there are no additional elements on the change list, the example process 700 completes, as in 724.

If it is determined at decision block 708 that the selected block and/or element is not defined as requiring a change confirmation, a determination may be made as to whether the selected block and/or element requires a change notification without confirmation, as in 710. Similar to a block and/or element requiring a change confirmation, a block and/or element may be defined as requiring a change notification without confirmation for any detected change to the block and/or element.

If it is determined that the selected block and/or element is defined as requiring a change notification without confirmation, the block and/or element included in the current instance of the smart file may be processed with the corresponding block and/or element of the stored instance of the smart file to determine the actual change that occurred to the block and/or element and a change notification generated and sent to the client without requesting confirmation, indicating the change that occurred to the block and/or element, as in 722.

If it is determined that the block and/or element is not defined to require a change notification without confirmation, the selected element of the selected block of the current instance of the smart file may be processed by the example process 700 to determine the actual change to the element, as in 712. The actual change determined for the element may then be considered and a determination made as to whether a change confirmation should be required for the change to the selected element of the selected block of the current instance of the smart file, as in 714. If it is determined that a change confirmation for the selected element of the selected block of the current instance of the smart file is to be obtained, the example process 700 returns to block 720 and continues.

If it is determined at decision block 714 that a change confirmation is not needed, a determination is made as to whether a change notification without confirmation is needed for the selected element of the selected block of the current instance of the smart file, as in 716. If it is determined that a change notification without confirmation is to be provided, the example process 700 returns to block 722 and continues. If it is determined at decision block 716 that a change notification without confirmation is not to be sent for the selected element of the selected block of the current instance of the smart file (e.g., no notification needed), the example process 700 returns to block 718 and continues.

Figure 8:
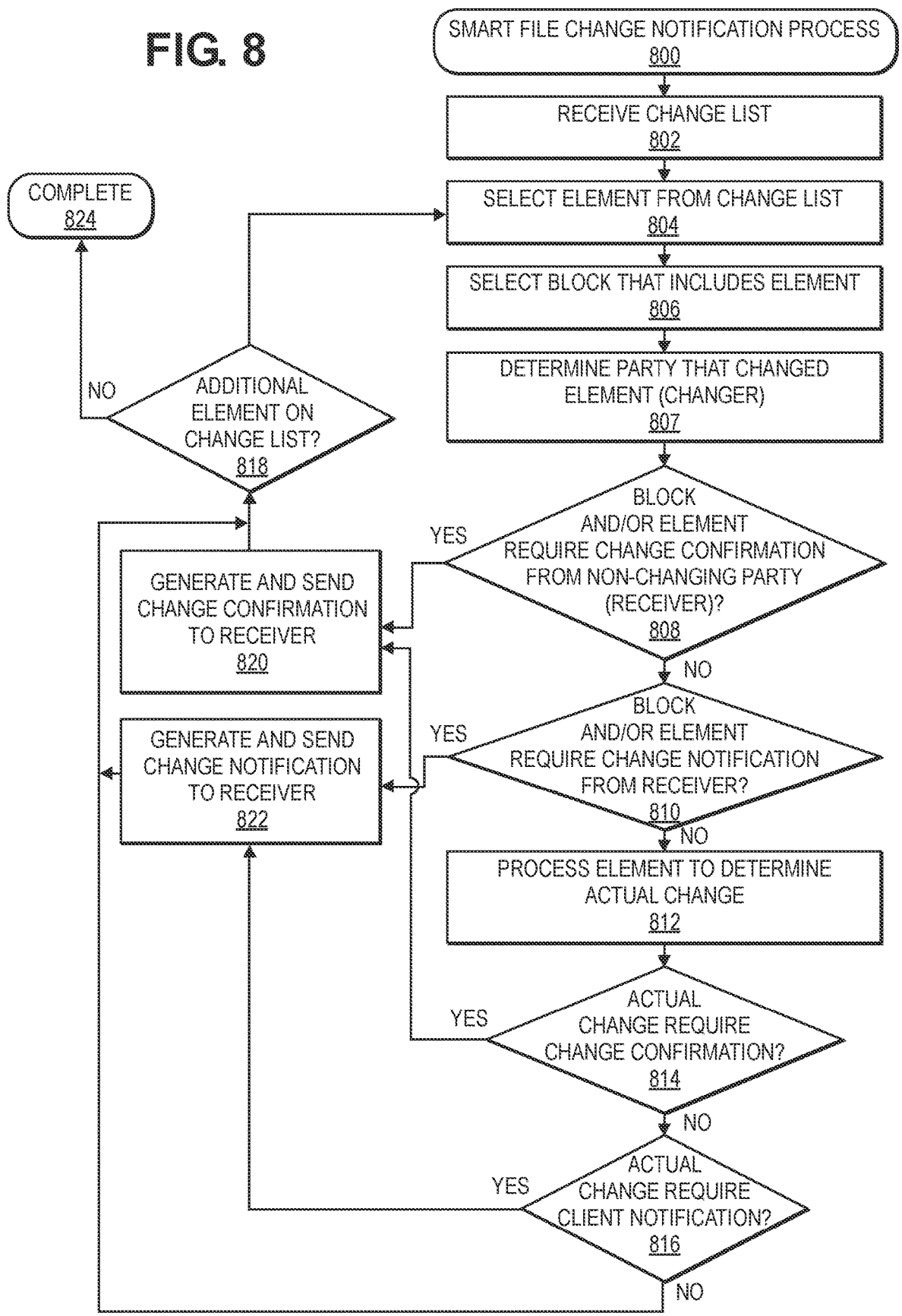
FIG. 8 is another example smart file change notification process, in accordance with disclosed implementations.

FIG. 8 is another example smart file change notification process 800, in accordance with disclosed implementations.

The example process 800 may be performed in response to generation of a change list by the example process 600 (FIG. 6). The example process 800 may be performed in implementations when either the client or the vendor may make changes to a smart file.

The example process 800 begins upon receipt of a change list for a current instance of a smart file, as in 802. An element indicated in the change list may then be selected, as in 804. A block that contains the selected element may then be selected, as in 806. For the selected block and/or element, it is determined what party (vendor or client) made the change (referred to herein as the "changer"), as in 807. For example, it may be determined that the changer is the last party that accessed the smart file.

In some implementations, a determination is made as to whether the block and/or the element is defined as requiring a change confirmation for any change to the block and/or element, as in 808. As discussed above, some blocks and/or elements may be defined as requiring a change confirmation for any change to the block and/or element.

If it is determined that the block and/or element is defined as requiring a change confirmation, the block and/or element included in the current instance of the smart file may be processed with the corresponding block and/or element of the stored instance of the smart file to determine the actual change that occurred to the block and/or element and a change request generated and sent to the non-changing party (referred to herein as the "receiver") for confirmation or approval of the change to the block and/or element, as in 820.

If it is determined at decision block 808 that the selected block and/or element is not defined as requiring a change confirmation, a determination may be made as to whether the selected block and/or element requires a change notification without confirmation be sent to the receiver, as in 810. Similar to a block and/or element requiring a change confirmation, a block and/or element may be defined as requiring a change notification without confirmation for any detected change to the block and/or element.

If it is determined that the selected block and/or element is defined as requiring a change notification without confirmation, the block and/or element included in the current instance of the smart file may be processed with the corresponding block and/or element of the stored instance of the smart file to determine the actual change that occurred to the block and/or element and a change notification generated and sent to the receiver without requesting confirmation, indicating the change that occurred to the block and/or element, as in 822.

If it is determined that the block and/or element is not defined to require a change notification without confirmation, the selected element of the selected block of the current instance of the smart file may be processed by the example process 800 to determine the actual change to the element, as in 812. The actual change determined for the element may then be considered and a determination made as to whether a change confirmation should be required for the change to the selected element of the selected block of the current instance of the smart file, as in 814. If it is determined that a change confirmation for the selected element of the selected block of the current instance of the smart file is to be obtained, the example process 800 returns to block 820 and continues.

After generating and sending the change request to the receiver (820), after generating and sending a notification to the receiver (822), or after determining that a notification is not required (816) for the change, a determination is made as to whether any additional elements are indicated on the change list, as in 818. If it is determined that there are additional elements on the change list, the example process 800 returns to block 804, selects a next element from the change list, and continues. If it is determined that there are no additional elements on the change list, the example process 800 completes, as in 824.

If it is determined at decision block 814 that a change confirmation is not needed, a determination is made as to whether a change notification without confirmation is needed for the selected element of the selected block of the current instance of the smart file, as in 816. If it is determined that a change notification without confirmation is to be provided, the example process 800 returns to block 822 and continues. If it is determined at decision block 816 that a change notification without confirmation is not to be sent for the selected element of the selected block of the current instance of the smart file (e.g., no notification needed), the example process 800 returns to block 818 and continues.

Figure 9:
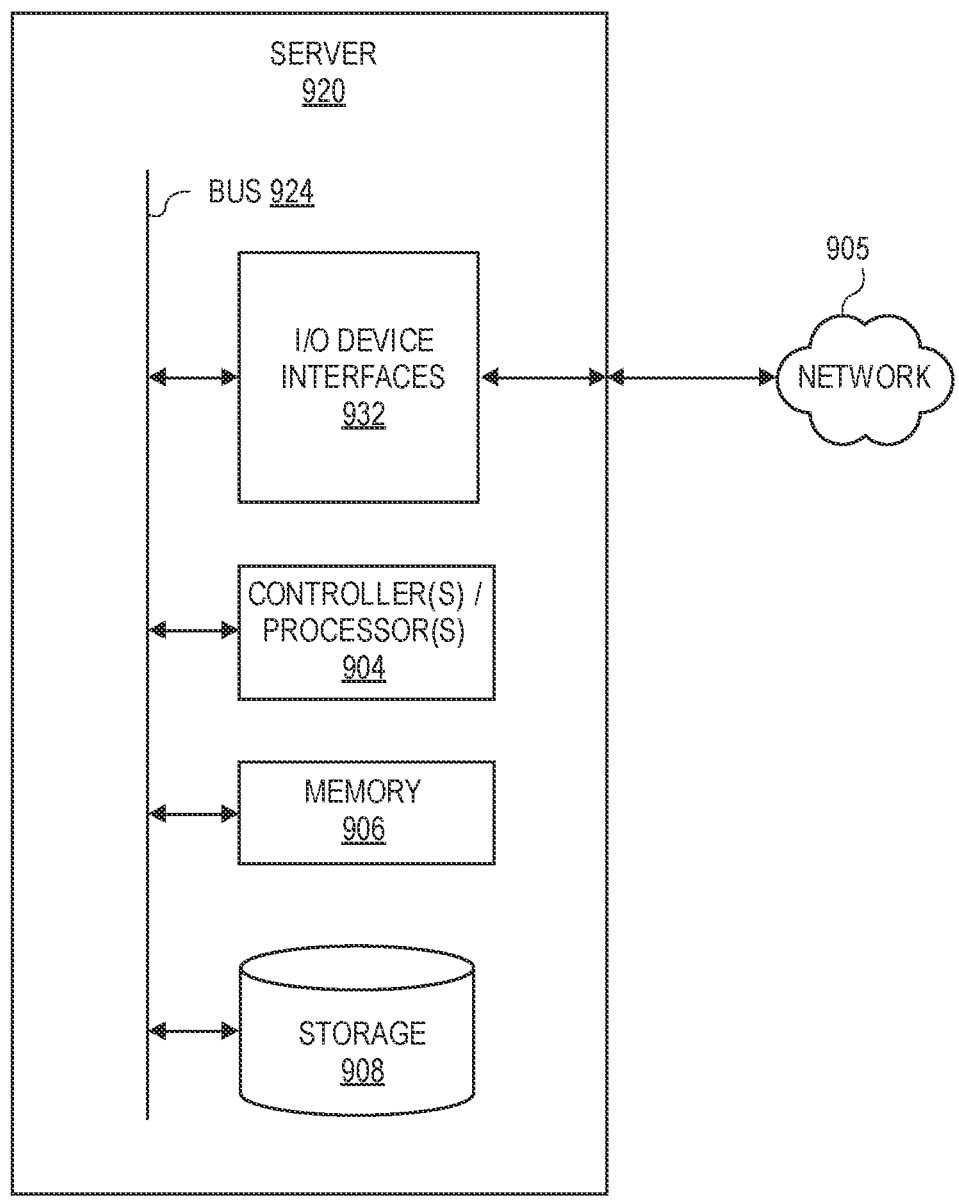
FIG. 9 is a block diagram illustrating example components of a remote computing resource, such as a remote server, in accordance with disclosed implementations.

FIG. 9 is a block diagram conceptually illustrating example components of a remote device, such as a remote server 920 that may assist with operation of the smart file service. In operation, the server 920 may include computer-readable and computer-executable instructions that reside on the server 920, as will be discussed further below.

The server 920 may include one or more controllers/processors 904, that may include a central processing unit (CPU) for processing data and computer-readable instructions, and a memory 906 for storing data and instructions of the respective device. The memories 906 may individually include volatile random-access memory (RAM), non-volatile read only memory (ROM), non-volatile magnetoresistive random access-memory (MRAM) and/or other types of memory. The server 920 may also include a data storage component 908, for storing data, such as smart templates, smart files, etc., and controller/processor-executable instructions. The data storage component 908 may include one or more non-volatile storage types such as magnetic storage, optical storage, solid-state storage, etc. The server 920 may also be connected to removable or external non-volatile memory and/or storage (such as a removable memory card, memory key drive, networked storage, etc.) through an input/output device interface 932.

Computer instructions for operating the server 920 and its various components may be executed by the controller(s)/processor(s) 904, using the memory 906 as temporary "working" storage at runtime. The server's 920 computer instructions may be stored in a non-transitory manner in non-volatile memory 906, storage 908, or an external device(s). Alternatively, some or all of the executable instructions may be embedded in hardware or firmware on the respective device in addition to, or instead of software.

The server 920 may also include input/output device interfaces 932. A variety of components may be connected through the input/output device interfaces. Additionally, the server 920 may include an address/data bus 924 for conveying data among components of the server 920. Each component within the server 920 may also be directly connected to other components in addition to (or instead of) being connected to other components across the bus 924.

Any form of wired and/or wireless communication may be utilized to facilitate communication between the server 920, the network 905, vendors, clients, and/or other devices or services. For example, any one or more of 802.15.4 (ZIGBEE), 802.11 (WI-FI), 802.16 (WiMAX), BLUETOOTH, Z-WAVE, near field communication ("NFC"), etc., may be used to communicate between the server 920 and one or more devices. The network 905, may be a wired network, wireless network, or a combination of wired and wireless. The network may be any form of communication network, such as the internet, an intranet, cellular, satellite, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, and communications should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   generating, with a hash function and for a first element of a first plurality of elements of a first block of a plurality of blocks of a first instance of a smart file, a first element hash value representative of the first element of the first block;
   generating, with the hash function and for a second element of the first plurality of elements of the first block, a second element hash value representative of the second element of the first block;

generating, with the hash function and for the first block of the plurality of blocks, a first block hash value representative of the first block;

generating, with the hash function and for a third element of a second plurality of elements of a second block of the plurality of blocks of the first instance of the smart file, a third element hash value representative of the third element of the second block;

generating, with the hash function and for a fourth element of the second plurality of elements of the second block, a fourth element hash value representative of the fourth element of the second block;

generating, with the hash function and for the second block of the plurality of blocks, a second block hash value representative of the second block;

storing, in a data store and with an association with the first instance of the smart file, each of the first element hash value, the second element hash value, the first block hash value, the third element hash value, the fourth element hash value, and the second block hash value;

subsequent to storing:
  determining that a first change to the smart file has occurred between the first instance of the smart file and a current instance of the smart file;

in response to determining that the first change has occurred:
  generating, with the hash function:
    a first current first block hash value representative of the first block of the current instance of the smart file; and
    a second current second block hash value representative of the second block of the current instance of the smart file;
  determining, based at least in part on a first comparison between the first current first block hash value and the first block hash value stored in the data store, that no change has occurred to the first block; and
  determining, based at least in part on a second comparison between the second current second block hash value and the second block hash value stored in the data store, that a second change has occurred to the second block between the first instance of the smart file and the current instance of the smart file;

in response to determining that the second change has occurred:
  generating, with the hash function:
    a third current third element hash value representative of the third element of the second block of the current instance of the smart file; and
    a fourth current fourth element hash value representative of the fourth element of the second block of the current instance of the smart file;
  determining, based at least in part on a third comparison between the third current third element hash value and the third element hash value stored in the data store, that no change has occurred to the third element of the second block; and
  determining, based at least in part on a fourth comparison between the fourth current fourth element hash value and the fourth element hash value stored in the data store, that a third change has occurred to the fourth element of the second block between the first instance of the smart file and the current instance of the smart file;

in response to determining the third change, processing the fourth element of the second block of the current instance of the smart file and the fourth element of the second block of the first instance of the smart file to determine an actual change to the smart file; and sending, for presentation, an indication of the actual change to the smart file.

2. The computer-implemented method of claim 1, further comprising:
determining, that the second block requires at least one of a notification or a request for confirmation of any change to the second block; and
in response to determining that the second block requires at least one of the notification or the request for confirmation, sending, for presentation, the indication of the actual change.

3. The computer-implemented method of claim 1, further comprising:
subsequent to sending, receiving an acceptance of the actual change; and
in response to the acceptance:
  updating the data store to replace the second block hash value with the second current second block hash value as representative of the second block of the smart file; and
  updating the data store to replace the fourth element hash value with the fourth current fourth element hash value as representative of the fourth element of the second block of the smart file.

4. The computer-implemented method of claim 1, further comprising:
generating the smart file from a smart template that includes at least the first block and the second block; and
causing the first instance of the smart file to be sent to a client; and
wherein sending the indication of the actual change includes, sending for presentation to the client, the actual change to the smart file.

5. The computer-implemented method of claim 4, further comprising:
generating, by a vendor, the smart template; and
wherein the smart file includes at least one of a contract between the vendor and the client, a service agreement between the vendor and the client, a schedule between the vendor and the client, an invoice between the vendor and the client, or a payment between the vendor and the client.

6. The computer-implemented method of claim 5, wherein:
the actual change is a change made by the vendor.

7. A computing system, comprising:
one or more processors; and
a memory storing program instructions that, when executed by the one or more processors, cause the one or more processors to at least:
  for each of a plurality of blocks of a smart file:
    generate a current block hash value representative of a current instance of the block of the smart file; and
    compare the current block hash value with a stored block hash value representative of a prior instance of the block of the smart file;
  determine, based at least in part on the comparisons of the current block hash values with the stored block hash values, that a first block of the plurality of blocks of the smart file has changed between the current instance of the smart file and the prior instance of the smart file;

in response to determination of the change of the first block, for each of a plurality of elements of the first block:
  generate a current element hash value representative of a current instance of the element of the first block; and
  compare the current element hash value with a stored element hash value representative of a prior instance of the element of the first block;
determine, based at least in part on the comparisons of the current element hash values with the stored element hash values, that a first element of the plurality of elements of the first block has changed between the current instance of the smart file and the prior instance of the smart file;
determine an actual change to the first element between the current instance of the smart file and the prior instance of the smart file; and
send, for presentation, an indication of the actual change.

8. The computing system of claim 7, wherein the program instructions that, when executed by the one or more processors to generate a current block hash value representative of a current instance of the block of the smart file, further includes instructions that, when executed by the one or more processors, further cause the one or more processors to at least:
  determine a first plurality of elements of the block that are to be mapped in generating the current block hash value;
  determine a second plurality of elements of the block that are to be excluded from the map in generating the current block hash value; and
  generate the current block hash value based on the first plurality of elements, without mapping the second plurality of elements.

9. The computing system of claim 7, wherein the program instructions that, when executed by the one or more processors, further cause the one or more processors to at least:
  generate the prior instance of the smart file from a smart template, wherein the smart template includes the first block; and
  generate a second smart file from the smart template; and
  wherein:
    the smart file includes information between a vendor and a first client; and
    the second smart file includes information between the vendor and a second client that is different than the first client.

10. The computing system of claim 9, wherein the program instructions that, when executed by the one or more processors, further cause the one or more processors to at least:
  receive, from the vendor, a change to the first block included in the smart template; and
  propagate the change from the smart template to the smart file and to the second smart file.

11. The computing system of claim 9, wherein the program instructions that, when executed by the one or more processors, further cause the one or more processors to at least:
  receive, from the vendor, a change to the first block included in the smart file; and
  maintain the change to the first block of the smart file without propagating the change to the smart template or the second smart file.

12. The computing system of claim 7, wherein the first block is at least one of a content block, a text block, an image block, a question block, a video block, a divider block, a vendor information block, a services block, a contract block, an invoice block, or a scheduler block.

13. The computing system of claim 7, wherein the program instructions that, when executed by the one or more processors, further cause the one or more processors to at least:
  determine that the actual change to the first block was caused by a vendor that created the smart file; and
  send, for presentation, the indication of the actual change to a client that is associated with the smart file.

14. The computing system of claim 13, wherein the smart file includes at least one of a contract between the vendor and the client, a service agreement between the vendor and the client, a schedule between the vendor and the client, an invoice between the vendor and the client, or a payment between the vendor and the client.

15. The computing system of claim 7, wherein the program instructions that, when executed by the one or more processors, further cause the one or more processors to at least:
  determine that the first block requires at least one of a notification or a request for confirmation for any change to the first block; and
  in response to determination that the first block requires at least one of the notification or the request for confirmation, send, for presentation, the indication of the actual change.

16. A method, comprising:
generating, from a smart template that includes a plurality of blocks, a first smart file between a vendor and a first client, wherein the first smart file includes, at least, the plurality of blocks and first client information;
generating, from the smart template, a second smart file between the vendor and a second client that is different than the first client, wherein the second smart file includes, at least, the plurality of blocks and second client information;
maintaining, in a data store:
  a first plurality of hash values corresponding to the first smart file and at least some of the plurality of blocks, and first client specific information included in the first smart file; and
  a second plurality of hash values corresponding to the second smart file, at least some of the plurality of blocks, and second client specific information included in the second smart file;
receiving a change to a first block of the plurality of blocks included in the smart template;
propagating the change to the first block of the plurality of blocks included in the first smart file and the first block of the plurality of blocks included in the second smart file;
subsequent to propagating the change, generating, from the first smart file, a current first block hash value;
determining, based at least in part on a comparison of the current first block hash value with a stored first block hash value included in the first plurality of hash values, that the first block of the first smart file has changed;
in response to determining that the first block of the first smart file has changed, generating, from a first element of the first block of the first smart file, a current first element hash value;
determining, based at least in part on a comparison of the current first element hash value with a stored first element hash value included in the first plurality of hash values, that the first element of the first block of the first smart file has changed;

determining the actual change to the first element of the first block of the first smart file; and sending, for presentation, a notification indicating the actual change or a request for confirmation of the actual change.

17. The method of claim 16, further comprising:

receiving an acceptance of the actual change; and updating the first plurality of hash values maintained in the data store to replace the first block hash value with the current first block hash value, and to replace the first element hash value with the current first element hash value.

18. The method of claim 16, further comprising:

generating, for a second block of the plurality of blocks of the first smart file, a current second block hash value;

determining, based at least in part on a comparison of the current second block hash value with a stored second block hash value included in the first plurality of hash values, that the second block of the first smart file has changed;

determining a second actual change to the second block of the first smart file; and sending, for presentation, at least one of a notification indicating the actual change and the second actual change or a request for confirmation of at least one of the actual change and the second actual change.

19. The method of claim 18, further comprising:

receiving, from the vendor, a change to the second block of the second smart file; and updating the second smart file with the change, without updating the smart template or the first smart file.

20. The method of claim 16, wherein hash values are not generated or maintained for at least some blocks of the plurality of blocks.

* * * * *